(12) United States Patent
Matsuoka et al.

(10) Patent No.: US 6,342,988 B1
(45) Date of Patent: Jan. 29, 2002

(54) RECORDING AND/OR REPRODUCING APPARATUS INCLUDING TAPE LOADING MECHANISM

(75) Inventors: Hidetoshi Matsuoka, Tokyo; Akira Tomitaka, Kawasaki, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/666,151

(22) Filed: Sep. 20, 2000

Related U.S. Application Data

(62) Division of application No. 09/148,452, filed on Sep. 4, 1998, now Pat. No. 6,157,512.

(30) Foreign Application Priority Data

| Sep. 9, 1997 | (JP) | ............................................. 9-243852 |
| Sep. 30, 1997 | (JP) | ............................................. 9-266614 |
| Dec. 5, 1997 | (JP) | ............................................. 9-335456 |

(51) Int. Cl.⁷ ........................................... G11B 15/665
(52) U.S. Cl. ............................................ 360/95; 360/85
(58) Field of Search ..................................... 360/85, 95

(56) References Cited

U.S. PATENT DOCUMENTS

| 5,365,386 A | * | 11/1994 | Konishi et al. ................ 360/85 |
| 5,731,925 A | * | 3/1998 | Kobayashi .................... 360/85 |
| 5,812,340 A | * | 9/1998 | Nishijima et al. .......... 360/96.5 |
| 5,901,011 A | * | 5/1999 | Chae et al. .................... 360/85 |
| 6,104,569 A | * | 8/2000 | Chae et al. .................... 360/85 |
| 6,157,512 A | * | 12/2000 | Matsuoka et al. ............. 360/85 |

* cited by examiner

Primary Examiner—Brian E. Miller
(74) Attorney, Agent, or Firm—Robin, Blecker & Daley

(57) ABSTRACT

A tape loading device includes a guide member having a guide slot, a guide post for drawing tape from a cassette, and a slider which supports the guide post and has a shaft guided along the guide slot, the shaft having a stopper for preventing the shaft from coming off the guide slot, wherein a clearance between the stopper and the guide member differs on opposite sides of the guide slot.

22 Claims, 23 Drawing Sheets

RECORDING AND/OR REPRODUCING APPARATUS INCLUDING TAPE LOADING MECHANISM

This application is a divisional of application Ser. No. 09/148,452, filed Sep. 4, 1998 now U.S. Pat. No. 6,157,512.

BACKGROUND OF THE INVENTION

1. Field of the Invention

The present invention relates to a recording and/or reproducing apparatus, such as a VCR (video cassette recorder), which includes a tape loading mechanism which draws tape from a tape cassette and forms a tape path.

2. Description of Related Art

In a general VCR which is one example of a recording and/or reproducing apparatus, after a tape cassette has been mounted, magnetic tape is drawn from the tape cassette by tape guide members and is wrapped around a rotary cylinder.

FIGS. 1 and 2 show the manner in which magnetic tape 201 is drawn from a tape cassette 200 by tape guide members 4. As shown in FIG. 1, if the tape cassette 200 is mounted, the tape guide members 4 are positioned in an opening portion 200a of the tape cassette 200.

Then, in a tape loading operation, the respective tape guide members 4 are guided along slots 8 formed in guide members 3, and tape drawing posts 5 and 6 of each of the tape guide members 4 draw the magnetic tape 201 from the tape cassette 200. Then, as shown in FIG. 2, when the respective tape guide members 4 reach the terminal ends of the slots 8, the magnetic tape 201 is wrapped around a rotary cylinder 101 so that a predetermined tape path is formed.

Each of the tape guide members 4 which travel along the respective slots 8 in the tape loading operation in the above-described manner has the construction and arrangement shown in FIG. 3 by way of example.

FIG. 3 is a diagrammatic cross-sectional view showing one of the tape guide members 4 and the corresponding one of the slots 8 formed between guide member portions 3a and 3b as viewed in a direction perpendicular to the slot 8. The tape drawing posts 5 and 6 are disposed on the top of the tape guide member 4, and an engagement pin 10 is secured to the bottom of the tape guide member 4. This engagement pin 10 is guided by the guide member portions 3a and 3b so that the tape guide member 4 can travel along the slot 8.

A flange portion 9 which is enlarged in width is formed at the bottom end of the engagement pin 10. This flange portion 9 prevents the tape guide member 4 from coming off the slot 8 in the upward direction. To this end, the flange portion 9 is formed to have a width W' larger than a width W of the slot 8.

Projections 4a are formed on the bottom of the tape guide member 4. While the tape guide member 4 is traveling, the projections 4a slide in contact with the corresponding guide member portions 3a and 3b.

To reduce resistance to the projections 4a which are sliding on the corresponding guide member portions 3a and 3b, a distance t' from a top end face 9c of the flange portion 9 to the projections 4a is set larger than a thickness t of the guide member 3. A clearance s between the top end face 9c of the flange portion 9 and the guide member portions 3a and 3b is set equal on the opposite sides of the slot 8.

In the field of such recording and/or reproducing apparatus such as a VCR, it has recently been desired to make the entire size of the apparatus smaller and smaller for more improved portability. In such a situation, it has been necessary to provide an arrangement which enables the tape guide member 4 to travel not only in the horizontal direction but also in the vertical direction.

FIG. 4 is a diagrammatic cross-sectional view showing the tape guide member 4 which is arranged to travel in the direction of an arrow A over the guide member 3 having a shape which extends in the horizontal direction up to an intermediate portion and bends downwardly at the intermediate portion. If the guide member 3 has a bent portion 11 which bends in the vertical direction in the manner shown in FIG. 4, the thickness t of each of the guide member portions 3a and 3b substantially increases at the bent portion 11. To allow the tape guide member 4 to easily pass through the bent portion 11, it is necessary to set a distance t" from the top end face 9c of the flange portion 9 to the projections 4a to a value greater than the distance t' shown in FIG. 3.

However, if the distance t" from the top end face 9c of the flange portion 9 to the projections 4a is set greater to allow the tape guide member 4 to easily pass through the bent portion 11, there is the disadvantage that the play between the tape guide member 4 and the guide member portions 3a and 3b increases in portions other than the bent portion 11.

In addition, there has been a risk that, owing to this play, the tape guide member 4 and the tape drawing posts 5 and 6 incline more than necessary and scratch the tape. There has also been a risk that if such inclination occurs while the tape guide member 4 is passing the vicinity of the rotary cylinder 101, the tape drawing posts 5 and 6 come into contact with and scratch the rotary cylinder 101.

The aforesaid arrangement which makes it possible to reduce the entire size of the apparatus, i.e., the arrangement which enables the tape guide member 4 to travel not only in the horizontal direction but also in the vertical direction, also has a number of problems connected with a positioning member for the tape guide member 4, as will be described below.

FIGS. 5(a) and 5(b) show different examples of an abutment portion for the positioning member. The end faces of the abutment portion for the tape guide member 4 are formed by faces approximately perpendicular to a surface (for example, the top surface as viewed in FIG. 5(a)) of a main chassis 102, as shown in FIG. 5(a), or by faces approximately perpendicular to a surface (for example, the top surface as viewed in FIG. 5(b)) of the positioning member 2, as shown in FIG. 5(b).

However, if the positioning member 2 has the construction shown in FIG. 5(a), moment occurs due to couples such as those shown by arrows A in FIG. 5(a) in a positioning pin 21 which is brought into abutment with an abutment portion 2a (refer to FIG. 1) having an approximately V-shaped notch. This moment works in the direction opposite to the direction of moment which originally works on the tape guide member 4 for positioning the tape guide member 4 at a predetermined position. Therefore, such moment has the problem of remarkably impairing the positioning stability of the tape guide member 4.

In these days, in many cases, to reduce manufacturing costs, positioning members have been formed by molding (with a plastic material) integrally with a rotary drum base. However, to constitute the positioning member 2 as shown in FIG. 5(b), in its manufacturing process, it is necessary to provide a mold with a predetermined slide mechanism for the purpose of removing the positioning member 2 from the mold, so that a mold having an extremely complicated structure is needed and the manufacturing costs increase. Further, in this case, since a multiplicity of products (the positioning member 2) are difficult to handle at a time, there is the problem that molding costs increase.

BRIEF SUMMARY OF THE INVENTION

To solve the above-described problems, an object of the present invention is to provide a recording and/or reproducing apparatus including a tape loading mechanism which is capable of reducing resistance to the sliding motion of a tape guide member which is traveling, and also of ensuring the clearance between a tape guide member and the guide member, even if a guide member is bent in a direction in which the clearance between the guide member and a tape guide member decreases.

A second object of the present invention is to provide a highly reliable positioning mechanism which can position a tape guide member stably and accurately, and whose manufacturing costs can be reduced because of its simple construction which makes it unnecessary to provide a mold with a slide mechanism during the manufacture of the positioning mechanism, and also a recording and/or reproducing apparatus having such highly reliable positioning mechanism as part of a tape loading mechanism.

To achieve the above objects, in accordance with one aspect of the present invention, there is provided a tape loading device which comprises a guide member having a guide slot, a guide post for drawing tape from a cassette, and a slider which supports the guide post and has a shaft guided along the guide slot, the shaft having a stopper for preventing the shaft from coming off the guide slot, wherein a clearance between the stopper and the guide member differs on opposite sides of the guide slot.

In accordance with another aspect of the present invention, there is provided a tape loading device which comprises a tape guide disposed for movement over a chassis surface and having a tape drawing portion and a positioning pin, and a positioning member having an inclined portion inclined with respect to the chassis surface, the inclined portion having an abutment portion formed in a recess-like shape and the positioning pin being positioned by the abutment portion, wherein the abutment portion has opposed faces, and an inclined face which is inclined with respect to a plane approximately perpendicular to the chassis surface is continuously formed on at least part of either one of the opposed faces which is positioned relatively above the other face owing to an inclination of the abutment portion with respect to the chassis surface, the inclined face being inclined in a direction away from a surface opposed to the inclined face.

In accordance with another aspect of the present invention, there is provided a tape loading device which comprises first guide means and second guide means for performing a tape loading operation in which the first and second guide means travel while drawing tape from a cassette and wrap the tape around a cylinder at a predetermined position, first moving means for moving the first guide means at a predetermined speed, and second moving means for moving the second guide means while varying a moving speed thereof.

In accordance with another aspect of the present invention, there is provided a recording and/or reproducing apparatus which comprises a slidable chassis which is movably disposed on a main chassis and on which a cassette is mounted, a cylinder which is disposed on the main chassis and which has a magnetic head, first guide means and second guide means for performing a tape loading operation in which the first and second guide means travel while drawing tape from the cassette and wrap the tape around the cylinder at a predetermined position, first moving means for moving the first guide means at a predetermined speed, and second moving means for moving the second guide means while varying a moving speed thereof.

The above and other objects, features and advantages of the present invention will become apparent from the following detailed description of a preferred embodiment of the present invention, taken in conjunction with the accompanying drawings.

DETAILED DESCRIPTION OF THE INVENTION

Figure 1:
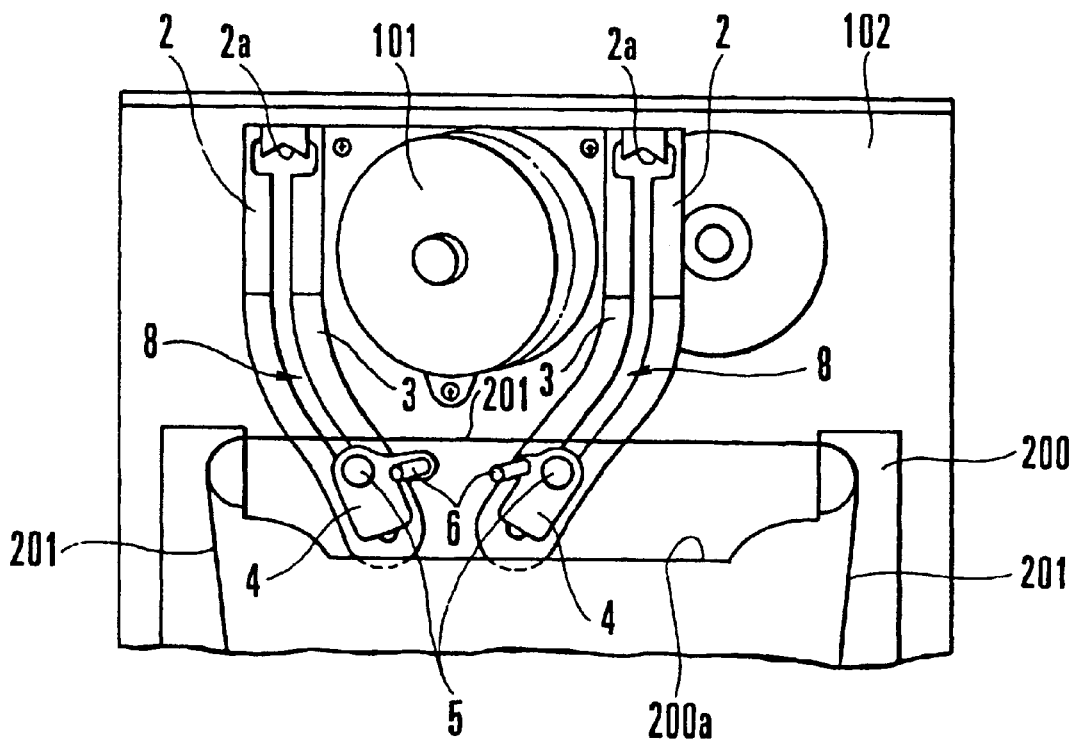
FIG. 1 is a diagrammatic plan view showing the unloading state of a conventional recording and/or reproducing apparatus.
Figure 2:
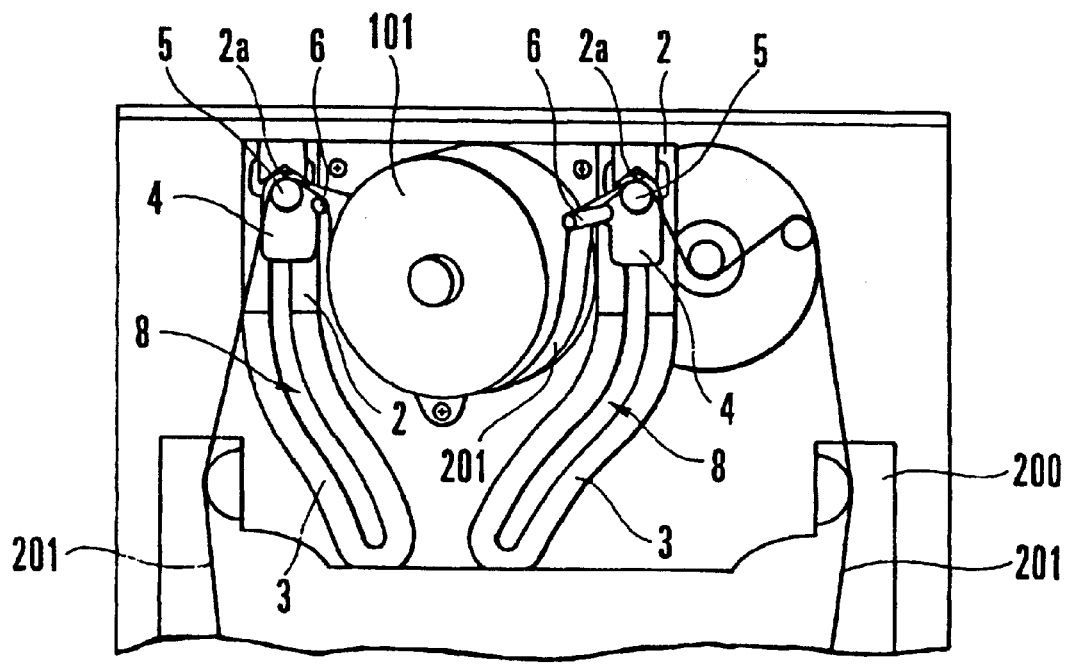
FIG. 2 is a diagrammatic plan view showing the loading state of the conventional recording and/or reproducing apparatus.
Figure 3:
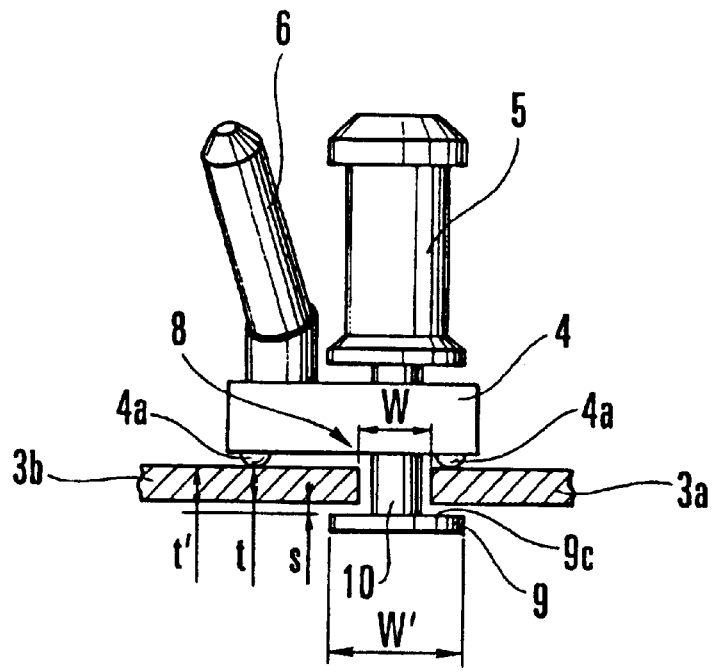
FIG. 3 is a diagrammatic cross-sectional view showing a tape guide member for the conventional recording and/or reproducing apparatus.
Figure 4:
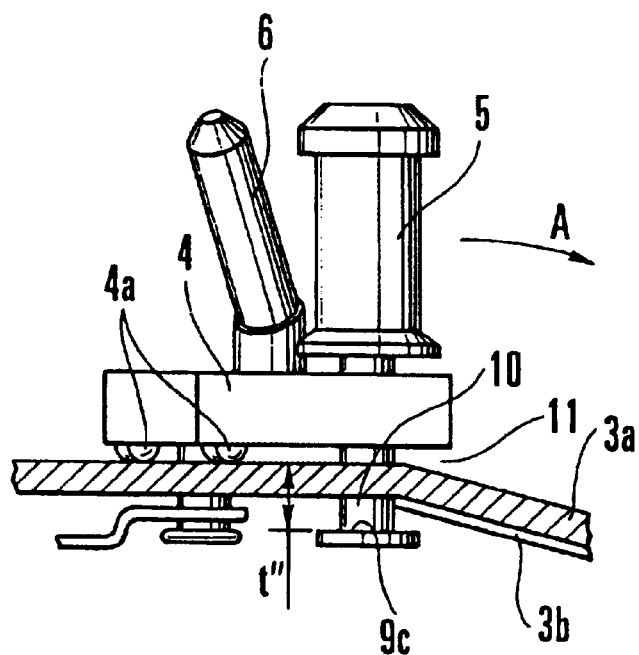
FIG. 4 is a diagrammatic cross-sectional view showing the tape guide member which is located in a bent portion of the conventional recording and/or reproducing apparatus.
Figure 5B:
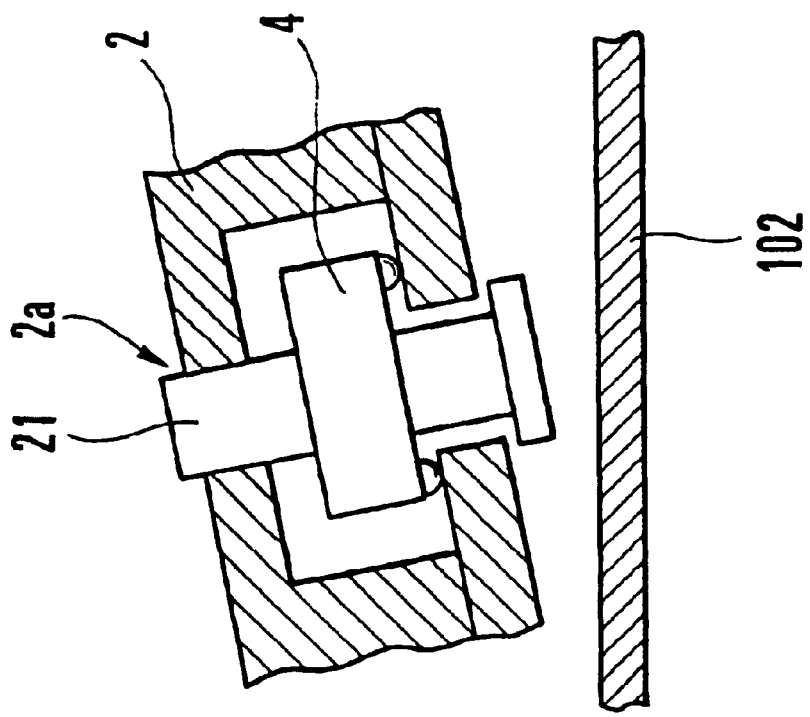
FIGS. 5(*a*) and 5(*b*) are fragmentary enlarged cross-sectional views showing manners in which tape guide members are in abutment with abutment portions in different examples of the conventional recording and/or reproducing apparatus.
Figure 5A:
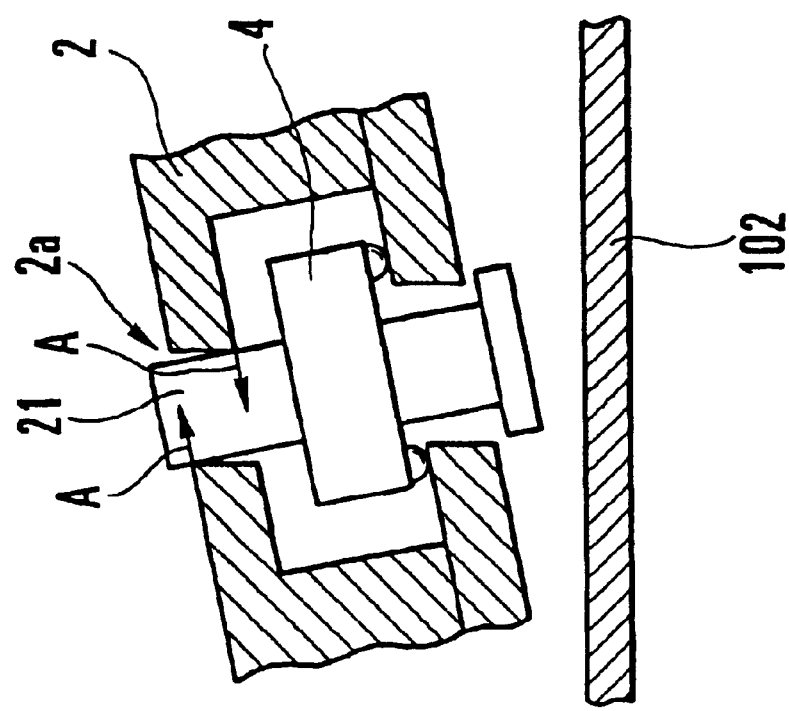

A preferred embodiment of the present invention will be described below in detail with reference to the accompanying drawings. In the following description, identical reference numerals are used to denote members substantially identical or corresponding to those used in the previously described related art (refer to FIGS. 1 and 2 and the like).

Figure 6:
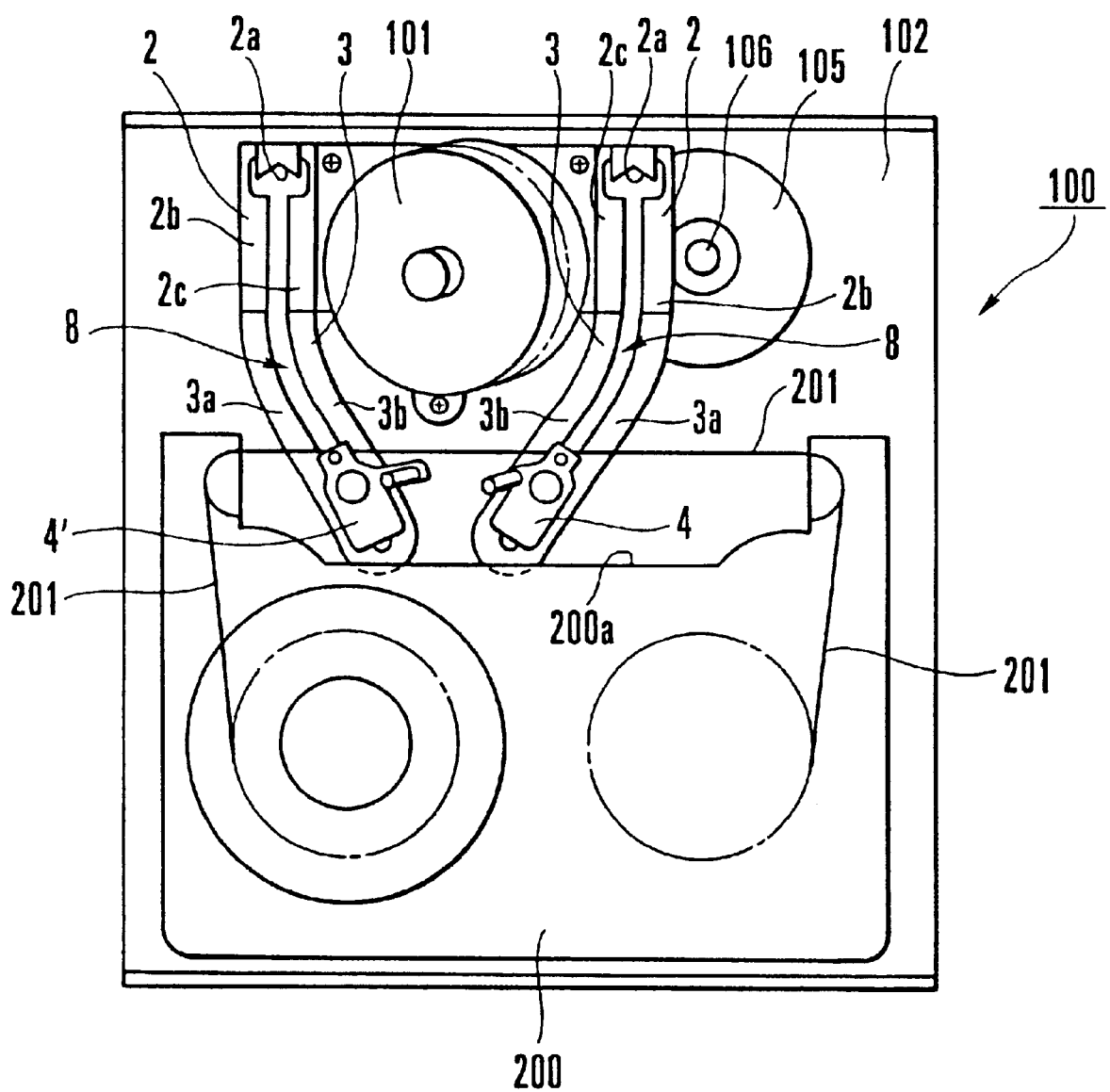
FIG. 6 is a diagrammatic plan view showing the whole of a recording and/or reproducing apparatus according to a preferred embodiment of the present invention.

First of all, an example of the entire construction of a VCR which is one example of the recording and/or reproducing apparatus according to the present invention will be described below. Referring to FIG. 6, a recorder 100 includes a rotary cylinder 101 which effects recording or reproduction of information on and from magnetic tape 201. This rotary cylinder 101 is disposed at a predetermined position of a main chassis 102. Tape reels and the like are disposed on the main chassis 102, and a tape cassette 200 in which the magnetic tape 201 is accommodated is mounted at a position opposing the rotary cylinder 101.

The recorder 100 also includes a capstan 106, a capstan motor 105, a tape guide member (slider) 4' for drawing the magnetic tape 201 from the tape cassette 200 on the tape entrance side of the rotary cylinder 101, a tape guide member (slider) 4 for drawing the magnetic tape 201 from the tape cassette 200 on the tape exit side of the rotary cylinder 101, and the like.

Guide members 3 are secured to the main chassis 102, and slots 8 for determining the directions of travel of the respective sliders 4 and 4' are formed in the corresponding guide members 3. Positioning members 2 are also secured to the main chassis 102, and the slots 8 are formed in the respective positioning members 2 in the vicinity of the rotary cylinder 101.

The tape loading operation of the recorder 100 will be described below. After the tape cassette 200 has been mounted on the main chassis 102, the sliders 4 and 4' travel along the respective slots 8 to draw the magnetic tape 201 from an opening portion 200a of the tape cassette 200.

The respective sliders 4 and 4' further proceed from the guide members 3 to the positioning members 2 along the slots 8, and are determined in position by coming into abutment with abutment faces 2a of the positioning members 2. When the sliders 4 and 4' reach their abutment positions, the magnetic tape 201 is wrapped around the rotary cylinder 101 by the tape drawing posts 5 and 6 disposed on each of the sliders 4 and 4'. Thus, in the recorder 100, the magnetic tape 201 is made to run along a predetermined tape path, whereby recording or reproduction can be effected (refer to FIGS. 1 and 2).

Figure 7:
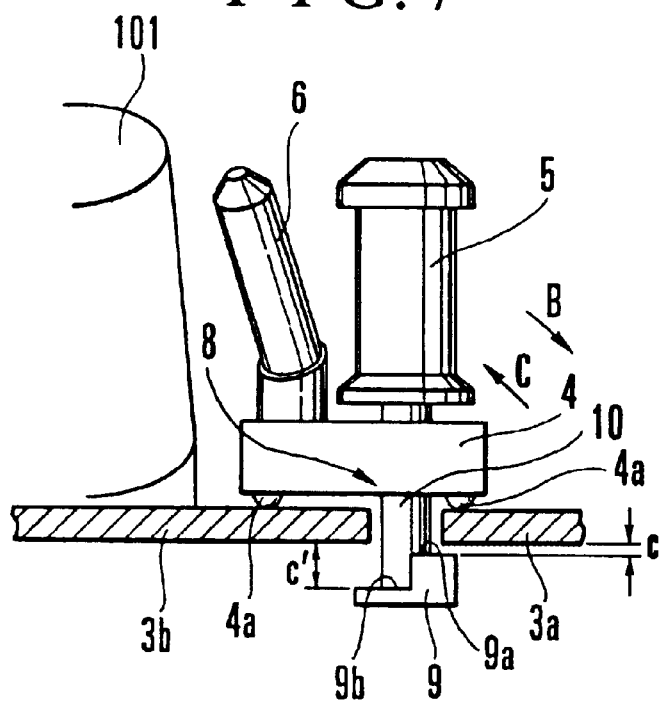
FIG. 7 is a diagrammatic side elevational view partly in cross section showing a tape guide member in the recording and/or reproducing apparatus according to the preferred embodiment of the present invention.

The structure of the portion of engagement between the slider 4 and the slot 8 will be described below. FIG. 7 is a diagrammatic side elevational view partly in cross section showing the state of engagement between the slider 4 and the guide member 3 which are located on the tape exit side. As described above, the tape drawing posts 5 and 6 are disposed on the top of the slider 4, and projections 4a are formed on the bottom of the slider 4. While the slider 4 is traveling, the projections 4a serve as sliding portions which slide in contact with the guide member 3 or the positioning member 2.

An engagement pin 10 which engages with the guide member 3 is secured to the bottom of the slider 4. The engagement pin 10 is fitted in the slot 8 for sliding motion with respect to guide member portions 3a and 3b located on the opposite sides of the slot 8. Accordingly, the slider 4 can travel along the slot 8. It is to be noted that since the slot 8 is formed over the guide member 3 and the positioning member 2, the engagement pin 10 is fitted in the slot 8 for sliding motion with respect to positioning member portions 2b and 2c in the vicinity of the rotary cylinder 101.

A flange portion 9 is formed at the bottom end of the engagement pin 10, and a top end face 9a and a top end face 9b which are separated from each other by a step are formed on the side of the flange portion 9 which opposes the guide member portions 3a and 3b. The distance (clearance) between the flange portion 9 and the guide member portion 3a on one side of the slot 8 differs from the distance (clearance) between the flange portion 9 and the guide member portion 3b on the other side of the slot 8. Specifically, as shown in FIG. 7, a clearance c between the flange portion 9 and the guide member portion 3a on the right side of the slot 8 is selected to be smaller than a clearance c' between the flange portion 9 and the guide member portion 3b on the left side of the slot 8.

Owing to this arrangement, the vertical motion of the slider 4 with respect to the guide member 3 is restricted by three points, i.e., the two projections 4a and the top end face 9a.

Accordingly, the vertical clearance between the slider 4 and the guide member 3 is substantially equal to the clearance c, and even if the slider 4 travels upwardly within such clearance, the top end face 9b does not come into abutment with the guide member portion 3b. Therefore, the area of abutment between the flange portion 9 and the guide member 3 during the sliding of the slider 4 can be reduced to half. Since the area of abutment is reduced, the sliding resistance between the slider 4 and the guide member 3 can be reduced.

As shown in FIG. 7, it is desirable that the top end face 9b which is spaced more apart from the guide member 3 be formed on a side closer to the rotary cylinder 101 with respect to the slot 8, while the top end face 9a which serves as a substantial abutment face be formed on the opposite side to the rotary cylinder 101 with respect to the slot 8. Owing to this arrangement, the slider 4 may incline in the direction of an arrow B as viewed in FIG. 7, but does not at all incline in the direction of an arrow C as viewed in FIG. 7, whereby the tape drawing posts 5 and 6 can be prevented from contacting the rotary cylinder 101.

Since the flange portion 9 is formed in the above-described manner, it is possible to minimize the sliding resistance even in an arrangement in which the guide member 3 is formed to bend in the vertical direction.

Figure 8A:
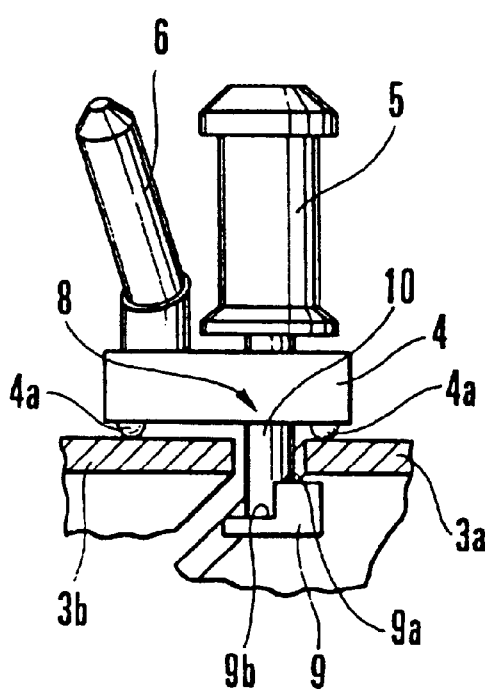
FIGS. 8(*a*) and 8(*b*) are diagrammatic side elevational views partly in cross section showing the tape guide member which is located in a bent portion in the recording and/or reproducing apparatus according to the preferred embodiment of the present invention.
Figure 8B:
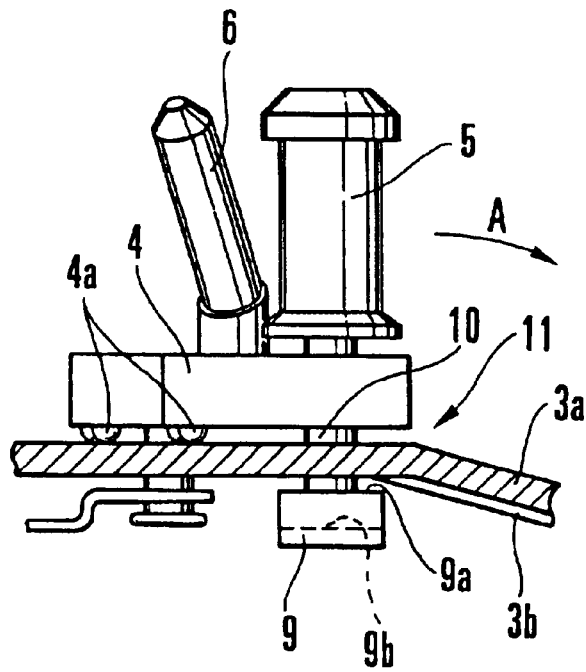

FIGS. 8(a) and 8(b) show the slider 4 which is located in a bent portion 11 of the guide member 3 which is bent downwardly toward the clearances c and c'. FIG. 8(a) is a partly cross-sectional, side elevational view as viewed in a direction perpendicular to the slot 8, while FIG. 8(b) is a partly cross-sectional, side elevational view as viewed obliquely from behind with respect to the direction (indicated by an arrow A) of travel of the slider 4.

Although the bent portion 11 is formed in an intermediate portion of the guide member 3, the guide member 3 and the flange portion 9 can be prevented from interfering with each other, because the clearance between the flange portion 9 and the guide member 3 is enlarged on one side of the slot 8. Accordingly, the slider 4 can be made to travel smoothly even in the bent portion 11.

In addition, even if the guide member 3 is formed to be twisted and bent in the vertical direction, it is possible to achieve effects similar to the above-described ones.

Figure 9:
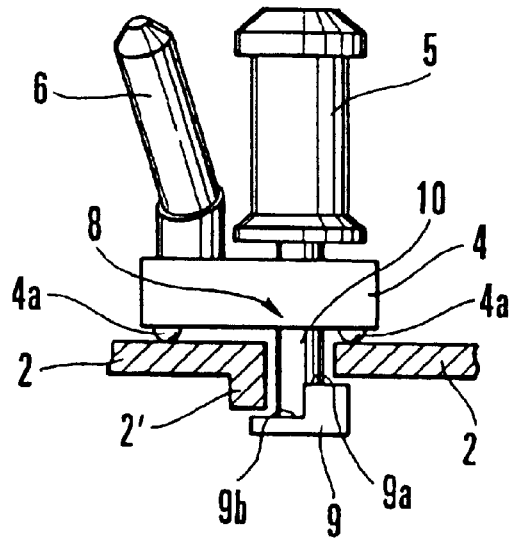
FIG. 9 is a diagrammatic side elevational view partly in cross section showing the tape guide member which is located above a positioning member in the recording and/or reproducing apparatus according to the preferred embodiment of the present invention.

As described above, when the tape loading operation comes to an end, the slider 4 is determined in horizontal position by coming into abutment with the abutment face 2a of the positioning member 2. FIG. 9 is a diagrammatic cross-sectional view taken in a direction perpendicular to the slot 8, showing the state of engagement between the positioning member 2 and the slider 4 which is in abutment with the abutment face 2a.

A projection 2' for reducing the clearance c' between the top end face 9b and the positioning member 2 to make the clearance c' equal to the clearance c is formed on the bottom of the positioning member 2.

Accordingly, when the tape loading operation is completed, a predetermined clearance is held on the opposite sides of the slot 8 by the projection 2', whereby it is possible to reliably position the slider 4 in either of the horizontal and vertical directions.

Such positioning mechanism will be described below in more detail.

Figure 10A:
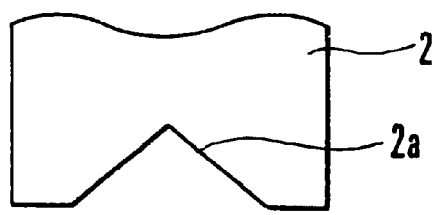
FIGS. 10(*a*), 10(*b*) and 10(*c*) are fragmentary enlarged views showing the state of an abutment portion for the tape guide member in a positioning mechanism which is a constituent element of the recording and/or reproducing apparatus according to the preferred embodiment of the present invention.
Figure 10B:
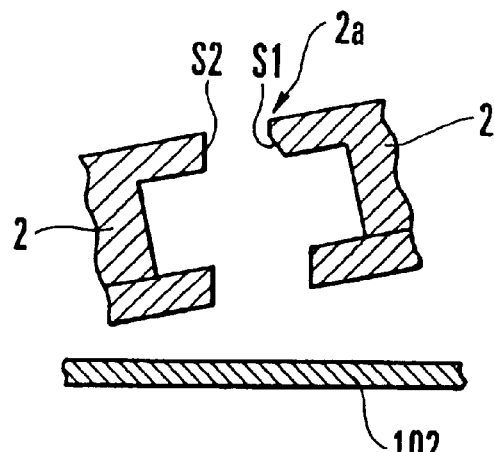
Figure 10C:
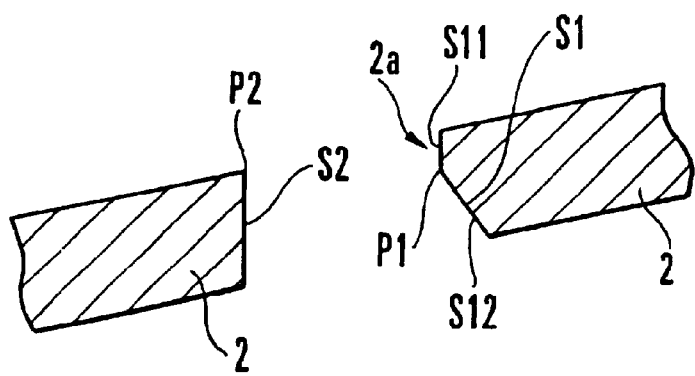

In the present embodiment, a mechanism constituted by the positioning members 2, the guide members 3 and the sliders 4 and 4' is referred to as the positioning mechanism. FIGS. 10(a) and 10(b) are respectively a diagrammatic plan view and a diagrammatic cross-sectional side view which show the positioning member 2 and the vicinity thereof on an enlarged scale, and FIG. 10(c) is a diagrammatic cross-sectional side view showing the abutment portion 2a of the positioning member 2 on an enlarged scale.

The positioning member 2 is formed integrally with the base of the rotary cylinder (rotary drum) 101, and as shown in FIG. 10(a), the abutment portion 2a is formed by an approximately V-shaped notch. In the abutment portion 2a, as shown in FIG. 10(b), part of a notch face S1 which is located relatively above a notch face S2 owing to the inclination of the positioning member 2 with respect to the surface of the main chassis 102 is chamfered off with respect to a plane approximately perpendicular to the surface of the main chassis 102. Accordingly, the notch face S1 is composed of a face S11 approximately perpendicular to the surface of the main chassis 102 and a face S12 which is formed by chamfering. The notch face S1 is chamfered off by not less than half the thickness t of the positioning member 2 so that the angle between the face S12 and the plane approximately perpendicular to the surface of the main chassis 102 is made larger than the angle of inclination of the surface of the positioning member 2 with respect to the surface of the main chassis 102. The notch face S2 is made approximately parallel to the face S11.

Figure 11:
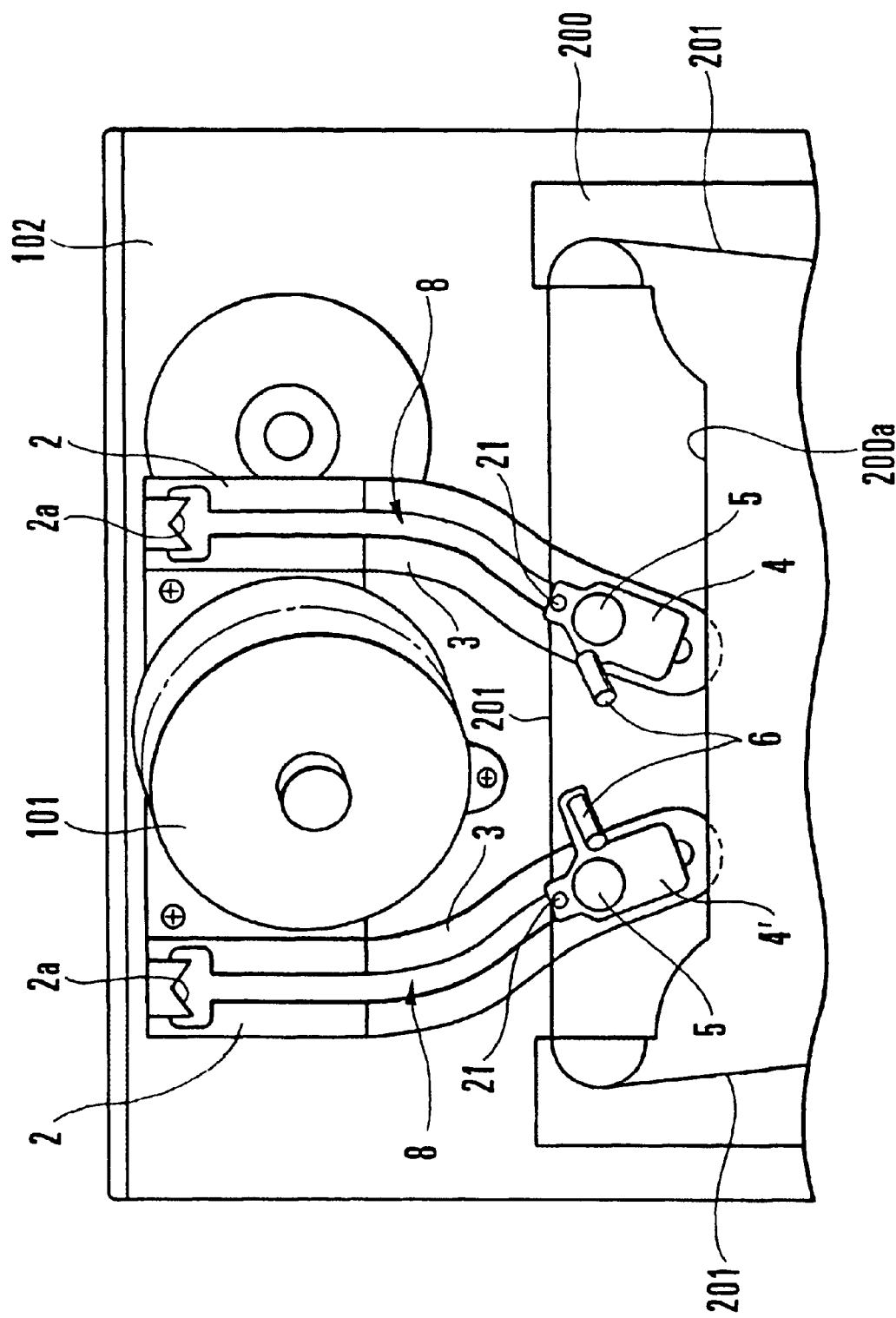
FIG. 11 is a diagrammatic plan view showing a state in which magnetic tape is not yet drawn, in the recording and/or reproducing apparatus according to the preferred embodiment of the present invention.

The tape loading operation of the recorder 100 will be described below with reference to FIGS. 11 and 12. First of all, as shown in FIG. 11, after the tape cassette 200 has been mounted on the main chassis 102, the sliders 4 and 4' travel along the respective slots 8 to draw the magnetic tape 201 from the opening portion 200a of the tape cassette 200.

Figure 13A:
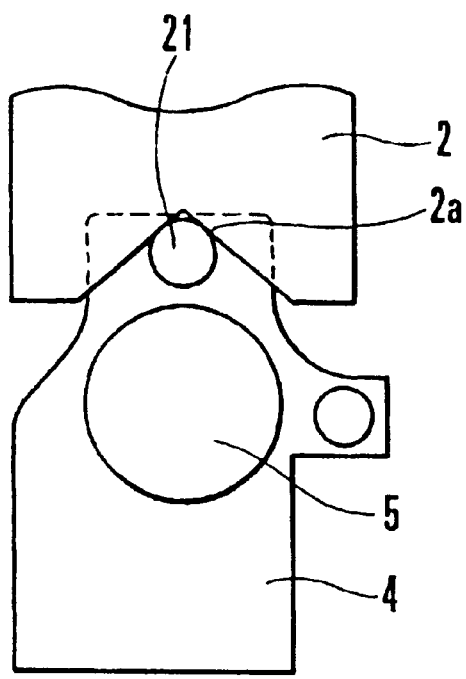
FIGS. 13(*a*), 13(*b*) and 13(*c*) are fragmentary enlarged views showing a state in which the tape guide member is in abutment with the abutment portion, in the positioning mechanism which is a constituent element of the recording and/or reproducing apparatus according to the preferred embodiment of the present invention.
Figure 13B:
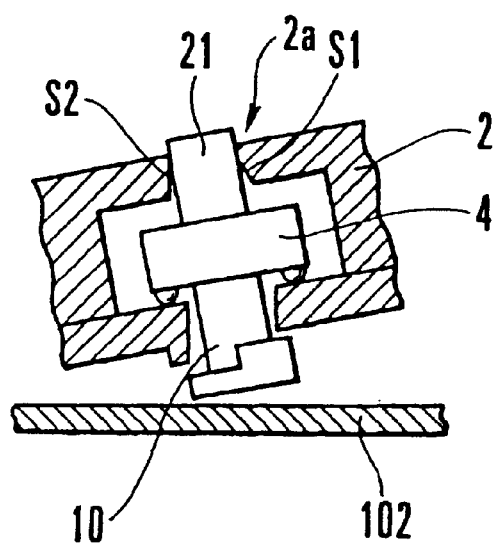
Figure 13C:
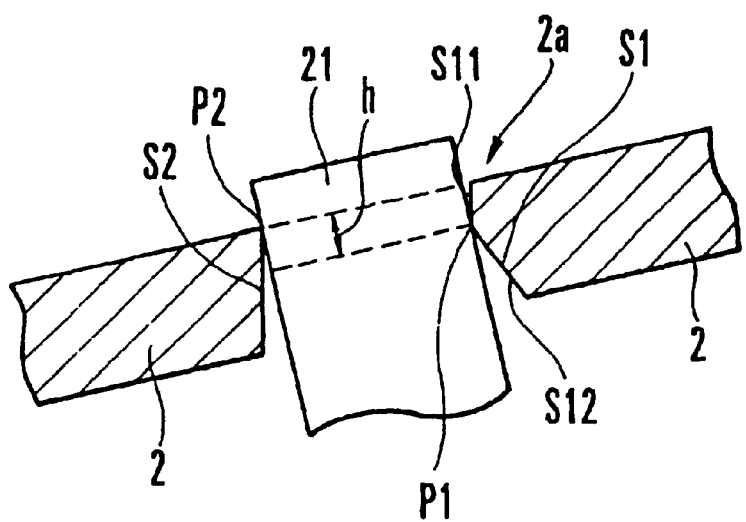

The respective sliders 4 and 4' further proceed from the guide members 3 to the positioning members 2 along the slots 8, and are determined in position by positioning pins 21 coming into abutment with the corresponding abutment faces 2a of the positioning members 2. The state of the slider 4 which is one of the sliders 4 and 4' positioned in this manner is shown in FIG. 13(a) in diagrammatic plan view and in FIGS. 13(b) and 13(c) in diagrammatic cross-sectional side view. In the present embodiment, when the positioning pin 21 comes into abutment with the abutment portion 2a, the positioning pin 21 is supported by the abutment portion 2a at two points P1 and P2. A distance h between the point of force P1 and the point of force P2 is reduced to an extremely small value by the face S11 formed by chamfering the notch face S1, so that the magnitude of the resultant moment decreases to a negligibly small value. Accordingly, the sliders 4 and 4' can be stably held on the respective positioning members 2.

Figure 12:
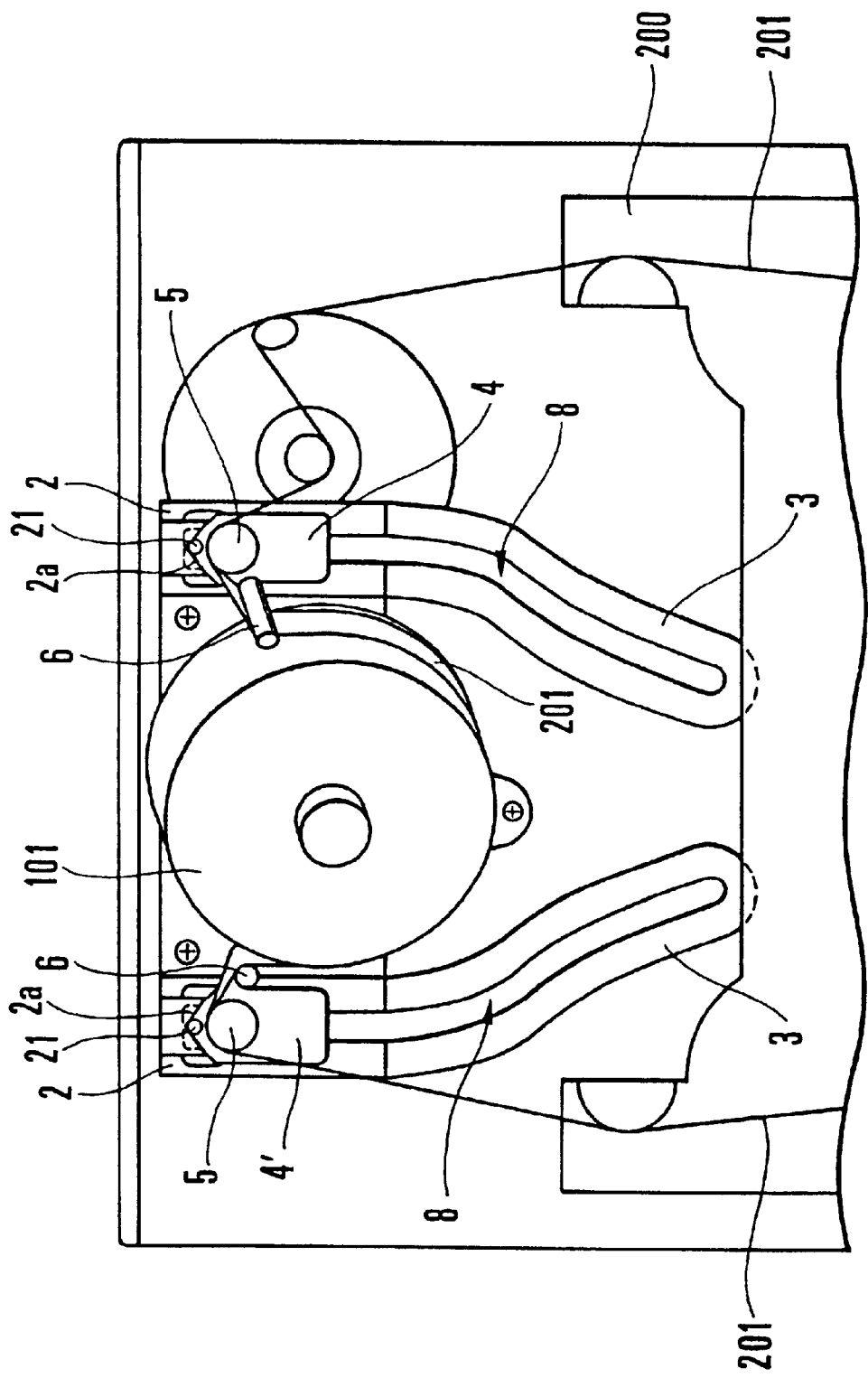
FIG. 12 is a diagrammatic plan view showing a state in which the magnetic tape is drawn and positioned by a tape loading operation, in the recording and/or reproducing apparatus according to the preferred embodiment of the present invention.

Then, as shown in FIG. 12, when the sliders 4 and 4' reach their abutment positions, the magnetic tape 201 is wrapped around the rotary cylinder 101 by the tape drawing posts 5 and 6 disposed on each of the sliders 4 and 4'. Thus, in the recorder 100, the magnetic tape 201 is made to run along a predetermined tape path, whereby recording or reproduction can be effected by the writing or reading of a magnetic recording through magnetic heads of the rotary cylinder 101.

As described above, in the positioning mechanism of the recorder 100 according to the present embodiment, during the loading of the magnetic tape 201, when the sliders 4 and 4' travel to the positioning member 2, the positioning pins 21 are brought into abutment with the corresponding abutment portions 2a of the positioning member 2, with the vertical distance h between the points of force P1 and P2 on the respective notch face S1 and S2 with which each of the positioning pins 21 comes into direct abutment being shortened by the amount of chamfering of the notch face S1 of the abutment portion 2a, so that the absolute values of moment due to couples acting on the respective points of force P1 and P2 are reduced. Accordingly, by adjusting the amount of the chamfering, it is possible to reduce the absolute values to a negligible extent, whereby it is possible to stably hold the positioning pins 21 on the abutment portions 2a and reliably position the sliders 4 and 4'.

In other words, the recorder 100 according to the present embodiment can position the sliders 4 and 4' stably and accurately, and can also be made inexpensive because of its simple construction which makes it unnecessary to provide a mold with a slide mechanism during the manufacture of the positioning mechanism.

In addition, as described previously, in the present embodiment, if the flange portion 9 is formed at the bottom end of the engagement pin 10 of each of the sliders 4 and 4' so that the clearance between the flange portion 9 and the guide member 3 differs between the opposite sides of the slot 8, the area of abutment between the guide member 3 and the flange portion 9 can be reduced to decrease the sliding resistance.

Accordingly, even if the bent portion 11 which is bent in the vertical direction is formed in an intermediate portion of the guide member 3, the guide member 3 and the flange portion 9 can be prevented from interfering with each other, and the slider 4 (4') can be made to travel smoothly.

In addition, at the time of completion of the tape loading operation, the clearance between the flange portion 9 and the positioning member 2 can be made approximately the same on the opposite sides of each of the slots 8 by the projection 2' of the positioning member 2. Thus, the slider 4 (4') which is reliably positioned can form a predetermined tape path.

In the present embodiment, the top end faces 9a and 9b are formed on the flange portion 9 with a step interposed therebetween so that the clearance between the flange portion 9 and the guide member portion 3a differs from the clearance between the flange portion 9 and the guide member portion 3b. However, the top end face of the flange portion 9 may be formed in the same plane on the opposite sides of the slot 8, and the thickness of the guide member portion 3a on one side of the slot 8 may be made different from the thickness of the guide member portion 3b on the other side of the slot 8.

In this case, if the positioning member 2 is formed in the same plane on the opposite sides of the slot 8, the clearance between the positioning member 2 and the flange portion 9 can be made equal on the opposite sides of the slot 8 at the time of completion of the tape loading operation. By setting this clearance to a predetermined amount, it is possible to reliably determine the vertical position of the slider 4 (4').

Although the above description of the embodiment does not refer to the fact that the tape cassette 200 travels over the main chassis 102, the tape cassette 200 is mounted on a slidable chassis, as will be described later, and is capable of traveling toward and away from the rotary cylinder 101. It is also to be noted that the above-described positioning mechanism can, of course, be applied to an arrangement in which a tape cassette is mounted on a fixed chassis.

Although the above description has referred to a tape guide mechanism and a positioning mechanism which constitute part of the tape loading mechanism in the present embodiment, a more specific description will be given in connection with a tape drawing mechanism.

First of all, to clarify the feature of the tape drawing mechanism in the present embodiment, one example of a conventional tape drawing mechanism will be described below.

Figure 14:
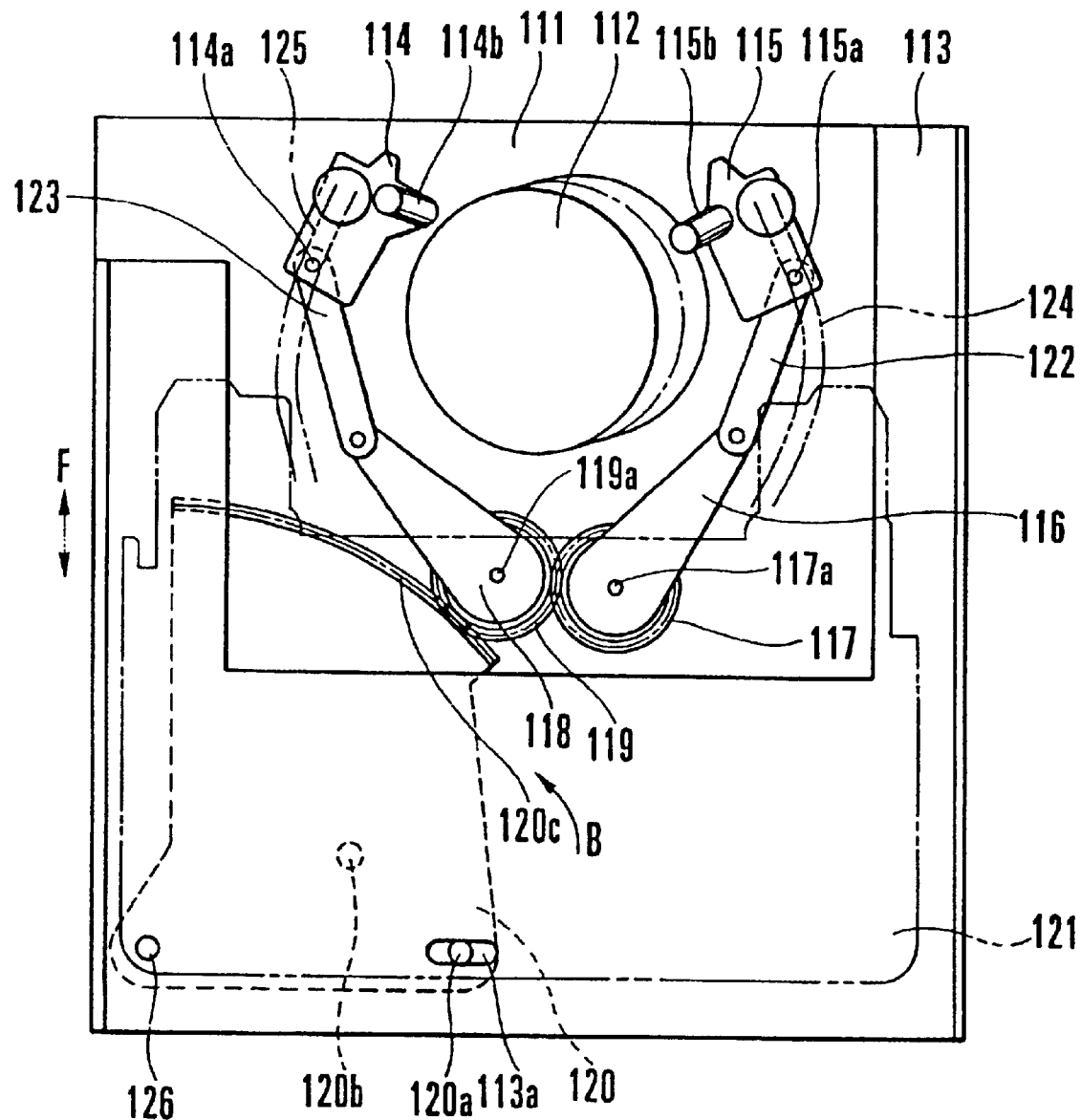
FIG. 14 is a diagrammatic plan view showing the construction of a conventional tape loading device.

FIG. 14 shows a conventional magnetic-tape loading device for drawing magnetic tape from a tape cassette and wrapping the magnetic tape around a rotary cylinder in a magnetic recording and/or reproducing apparatus whose entire size is reduced in such a way that the rotary cylinder is accommodated into a cassette mouth. In the following description, "M" denotes "main", "SR" denotes "supply-reel side", and "TR" denotes "take-up-reel side".

The conventional magnetic-tape loading device shown in FIG. 14 includes an M chassis 111 (denoted by 102 in FIG. 1), a rotary cylinder 112 (denoted by 101 in FIG. 1) which is provided on the M chassis 111, a slidable chassis 113 which is provided for movement back and forth above the M chassis 111 in opposite directions indicated by a double-headed arrow F, and a loading lever 120 which is turnably supported on the M chassis 111 via a shaft 120b and which has a gear portion 120c and a pin 120a with which a slot 113a provided in the slidable chassis 113 is slidably engaged. A cassette 121 is mounted on the slidable chassis 113 in a positionally restricted state.

The arrangement shown in FIG. 14 also includes an SR gear 119 which meshes with the gear portion 120c and is supported for rotation about a shaft 119a provided on the M chassis 111, an SR arm 118 which rotates integrally with the SR gear 119, an SR link 123 which is pivotally supported by the SR arm 118, an SR skate 114 which is rotatably supported on the SR link 123 via a shaft 114a and is provided with a guide post 114b for drawing the tape, and an SR rail 125 which is provided on the M chassis 111 and with which the shaft 114a is slidably engaged.

The arrangement shown in FIG. 14 also includes a TR gear 117 which meshes with the SR gear 119 and which is rotatably supported by a shaft 117a. A TR arm 116, a TR link 122, a SR skate 115, a shaft 115a, a guide post 115b and a TR rail 124 correspond to the SR arm 118, the SR link 123, the SR skate 114, the shaft 114a, the guide post 114b and the SR rail 125, respectively. Incidentally, FIG. 14 shows the state in which a tape loading operation is completed.

The operation of the above-described arrangement will be described below.

If a cam gear (not shown) is rotated by a motor (not shown), the loading lever 120 which is slidably engaged with the cam gear is rotated, whereby the SR gear 119 which meshes with the gear portion 120c of the loading lever 120 and the TR gear 117 which meshes with the SR gear 119 are rotated. The SR arm 118 rotates together with the SR gear 119, and the rotation of the SR arm 118 is transmitted to the SR skate 114 via the SR link 123 so that the SR skate 114 travels along the SR rail 125 via the shaft 114a, thereby effecting a tape loading operation.

In the meantime, since the TR gear 117 to the TR skate 115 are identical in arrangement to the SR gear 119 to the SR skate 114, the TR gear 117 which meshes with the SR gear 119 rotates in the opposite direction to the direction of rotation of the SR gear 119, thereby effecting a tape loading operation. In addition, since the loading lever 120 has the loading-lever pin 120a which is slidably engaged with the slot 113a of the slidable chassis 113 on which to mount the tape cassette 121, the slidable chassis 113 also travels upwardly as viewed in FIG. 14 with the rotation of the loading lever 120 in interlocking relation to the tape loading operations of both the SR skate 114 and the TR skate 115.

In the above-described operation, the tape (not show) is drawn from the tape cassette 121 and wrapped around the periphery of the rotary cylinder 112 by the two guide posts 114b and 115b.

However, if, in order to reduce the depth of an recording and/or reproducing apparatus, the above-described conventional example is used to arrange a tape drawing mechanism so that a rotary cylinder can be accommodated into a small cassette mouth of a tape cassette to be used in, for example, a digital VCR, there is the problem that as the tape cassette travels toward the rotary cylinder from a position away from the same, passage spaces for guide posts for drawing magnetic tape between the side walls of the cassette mouth and the rotary cylinder become smaller, and such spaces are finally lost while the tape cassette is traveling. As a result, there is the problem that it is necessary to incorporate members for separately driving skates on which the guide rollers are respectively provided and a slidable chassis on which the tape cassette is mounted and which travels with respect to the rotary cylinder, so that a complicated mechanism is needed and the number of component parts is difficult to reduce.

To achieve the above problems, the tape drawing mechanism according to the present embodiment includes first guide means and second guide means for performing a tape loading operation in which the first and second guide means travel while drawing tape from a tape cassette and wrap the tape around a rotary cylinder at a predetermined position, first moving means for moving the first guide means at a predetermined speed, and second moving means for moving the second guide means while varying a moving speed thereof. The following is a detailed description of the tape drawing mechanism.

Figure 15:
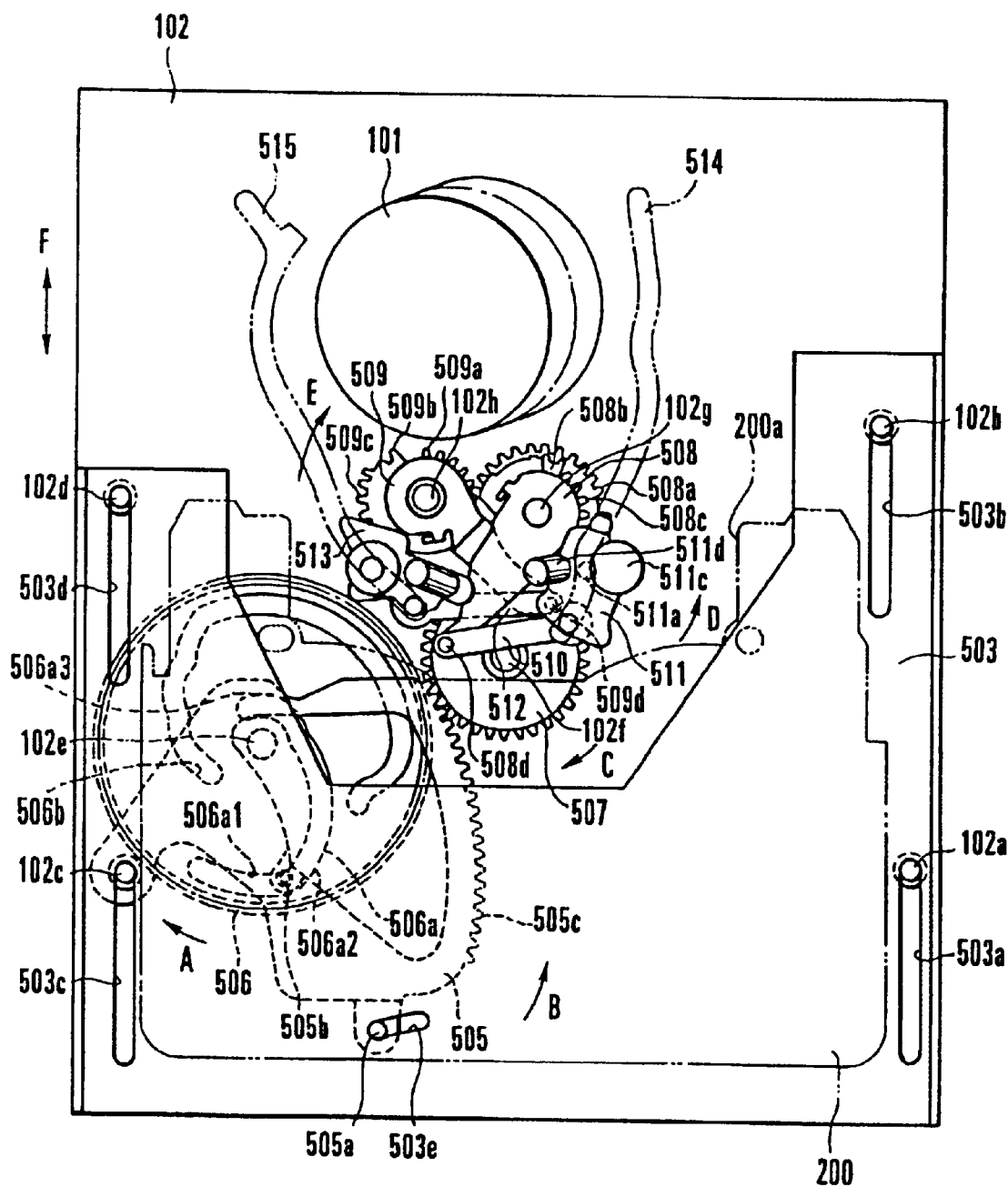
FIG. 15 is a diagrammatic plan view showing the unloading state of a tape loading device according to the preferred embodiment of the present invention.
Figure 16:
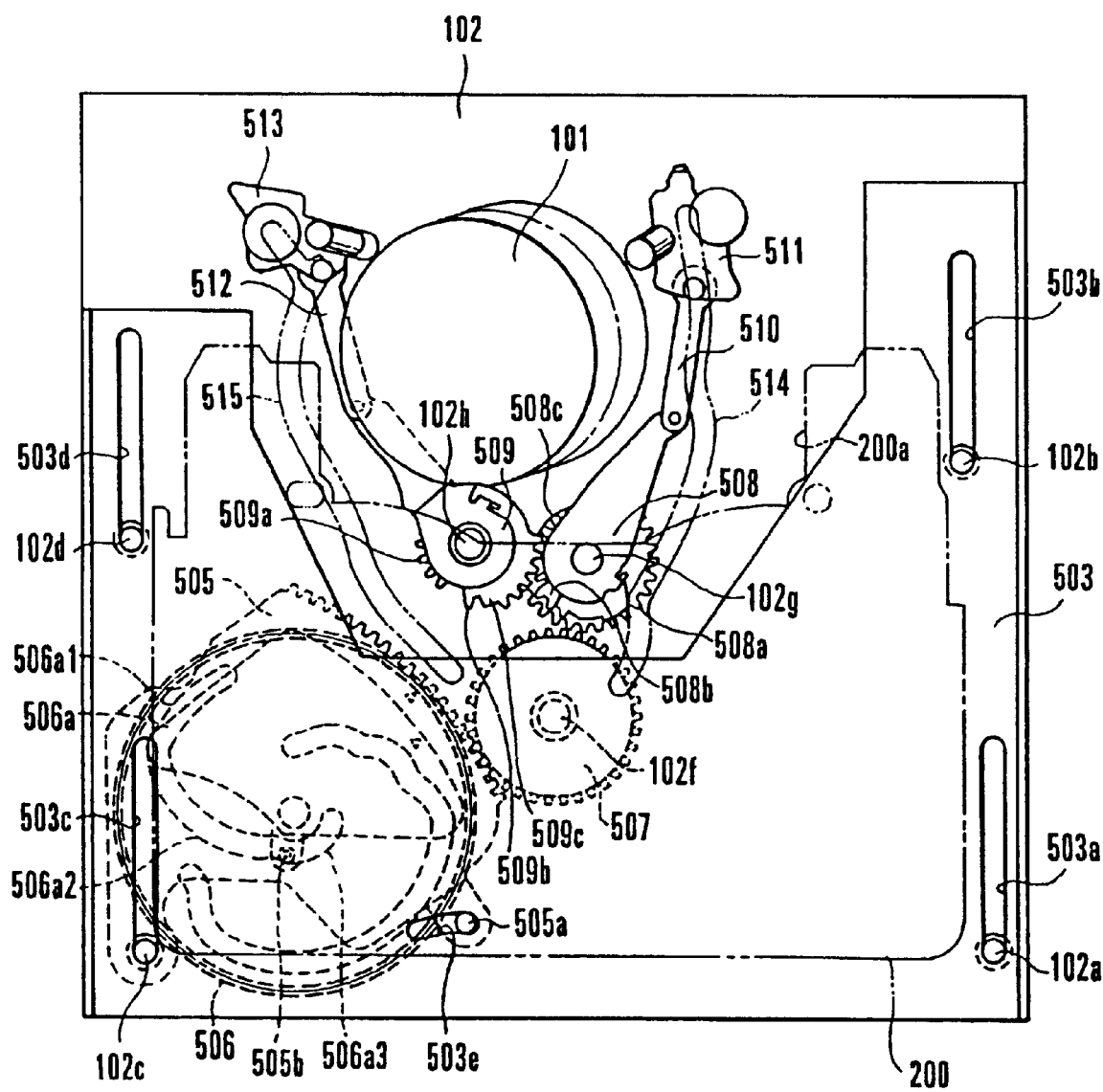
FIG. 16 is a diagrammatic plan view showing the loading state of the tape loading device shown in FIG. 15.
Figure 17:
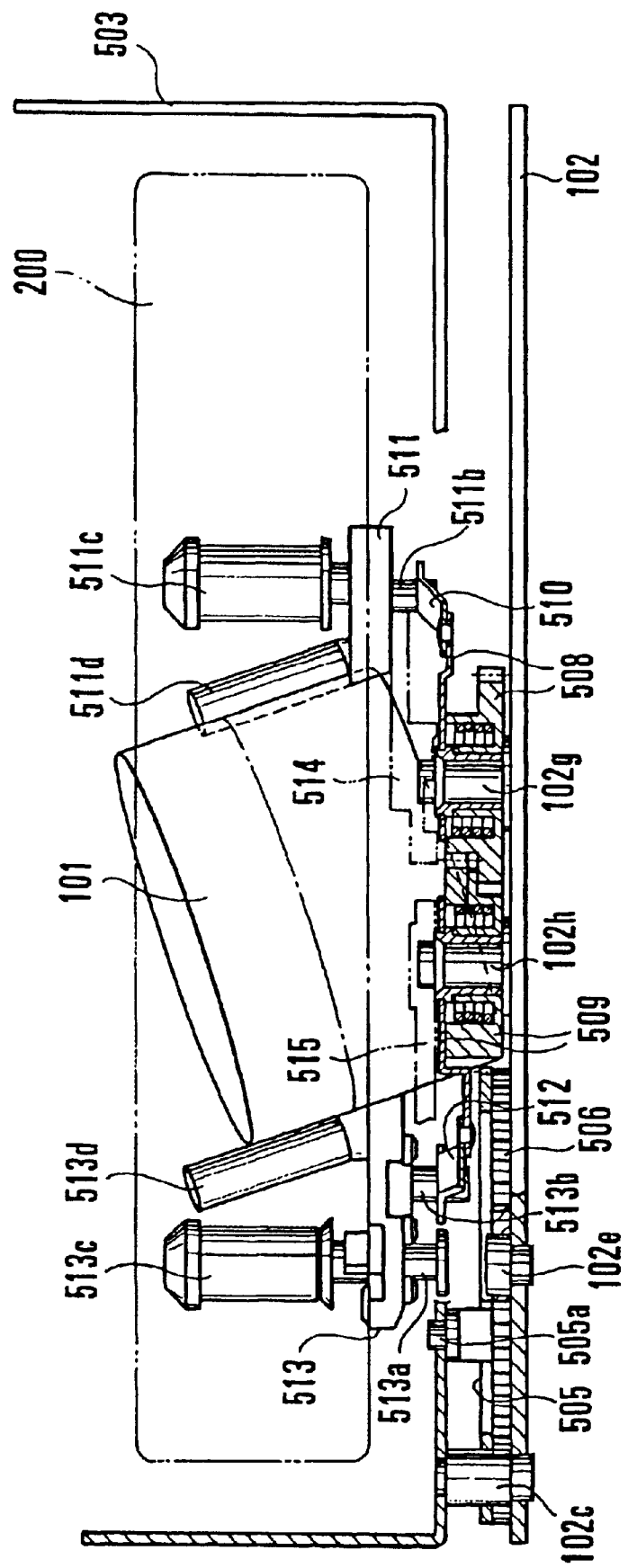
FIG. 17 is a diagrammatic side elevational view showing part of the tape loading device shown in FIG. 15.
Figure 18:
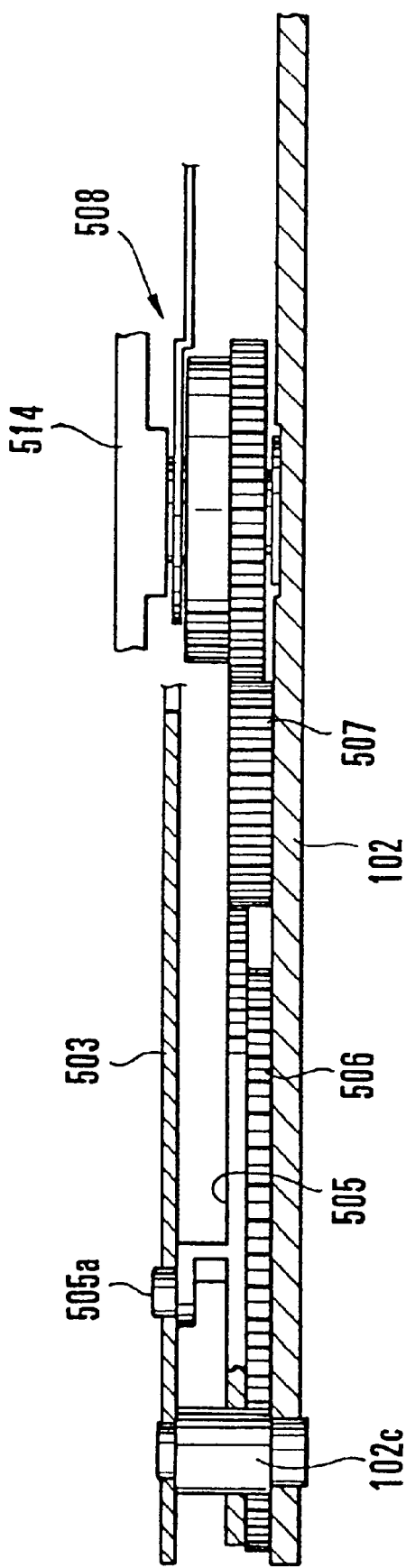
FIG. 18 is a diagrammatic side elevational view showing part of the tape loading device shown in FIG. 15.
Figure 19:
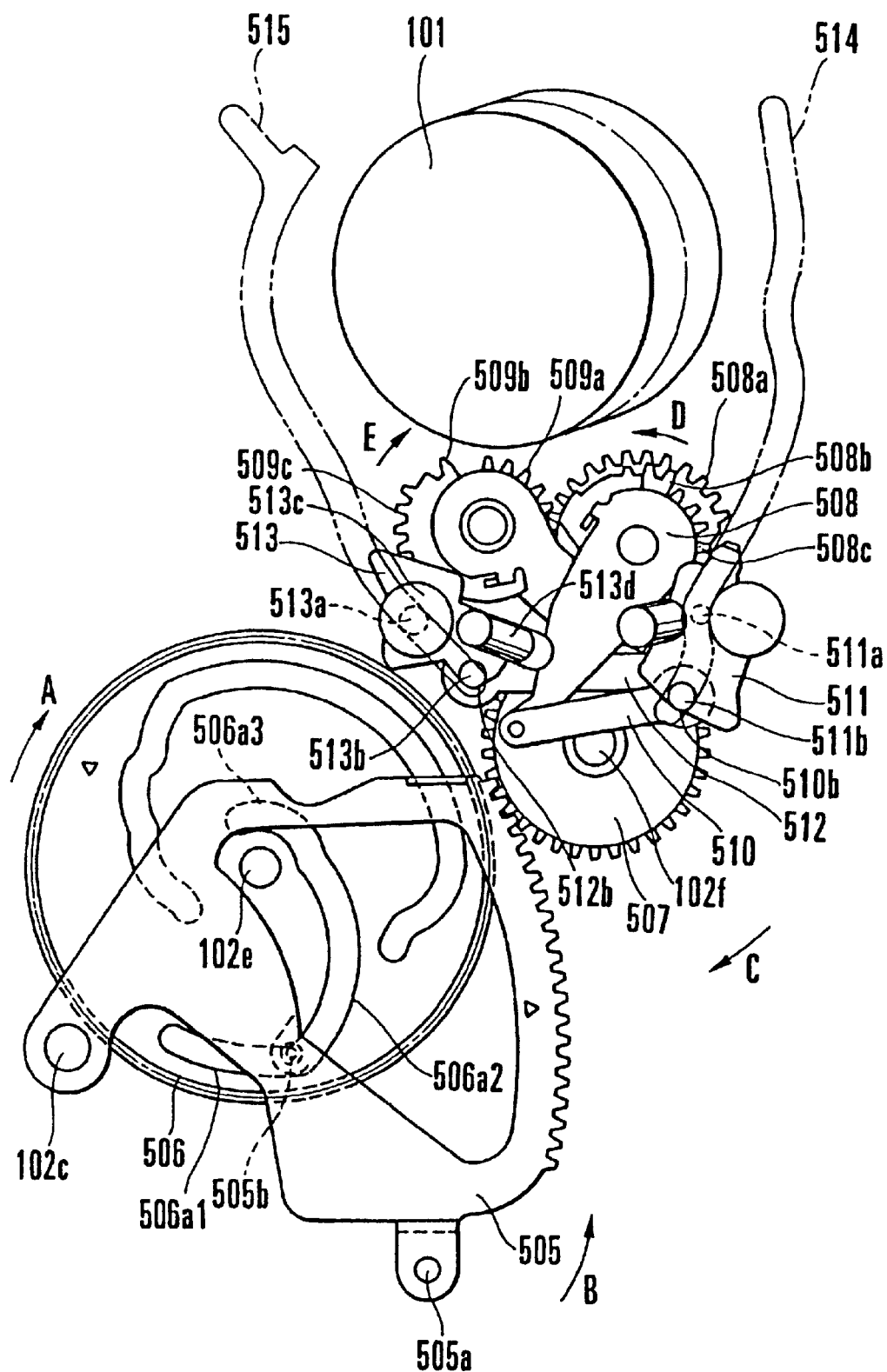
FIG. 19 is a plan view showing in detail the unloading state of the tape loading device shown in FIG. 15.

FIGS. 15 to 22 are diagrammatic views of the construction of a tape loading device according to the embodiment of the present invention. FIG. 15 shows an unloading state, FIG. 16 shows a loading-complete state, FIGS. 17 and 18 are fragmentary side views, and FIGS. 19 to 22 show different operational states from the unloading state to the loading-complete state.

Referring to FIGS. 15 to 22, the rotary cylinder 101 is disposed on the M chassis 102 via a mounting member (drum base) which is not shown. The tape cassette 200 having the cassette mouth (opening portion) 200a is mounted on a slidable chassis 503 by a cassette holder and positioning members (none of which is shown). The slidable chassis 503 is disposed for movement back and forth with respect to the M chassis 102 in opposite directions indicated by the double-headed arrow F, by means of slide slots 503a to 503d which are respectively slidably engaged with slide guide shafts 102a to 102d which are erected on the M chassis 102. A slide lever 505 is disposed for rotation about the slide guide shaft 102c of the slidable chassis 503, and has a slide pin 505a, a slide driving shaft 505b and a gear portion 505c which is formed over its peripheral portion. The slide pin 505a is slidably engaged with the slot 503e of the slidable chassis 503.

A cam gear 506 is disposed for rotation about a slide guide shaft 102e which is erected on the M chassis 102, and has cam slots 506a and 506b, and the slide driving shaft 505b is slidably engaged with the cam slot 506a. A loading gear 507 has a gear portion formed around its periphery, and is disposed for rotation about a loading shaft 102f which is erected on the M chassis 102. A TR arm 508 has three kinds of gear portions 508a, 508b and 508c which differ from one another in pitch and diameter. The TR arm 508 is rotatably engaged with a TR shaft 102g which is erected on the M chassis 102, and meshes with the gear portion of the loading gear 507 at the gear portion 508a. A TR link 510 is disposed for rotation about a TR link pin 508d of the TR arm 508.

An SR arm 509 has a gear portion 509a to mesh with the gear portion 508a of the TR arm 508, a gear portion 509b to mesh with the gear portion 508b of the TR arm 508, and a gear portion 509c to mesh with the gear portion 508c of the TR arm 508. During the rotation of the SR arm 509, the gear portions 509a, 509b and 509c mesh with the respective gear portions 508a, 508b and 508c of the TR arm 508 in a sequentially switched manner which will be described later. The SR arm 509 is disposed for rotation about the SR shaft 102b which is erected on the M chassis 102. An SR link 512 is disposed for rotation about an SR link pin 509d of the SR arm 509.

A TR skate 511 has guide posts 511c and 511d, and is disposed for rotation about the axis of a hole portion 510b (refer to FIG. 19) of the TR link 510 and has a skate guide 511b which is slidably engaged with a guide rail 514 together with a skate guide 511a. An SR skate 513 has guide posts 513c and 513d (refer to FIG. 19), and is disposed for rotation about the axis of a hole portion 512b (refer to FIG. 19) of the SR link 512 and has a skate guide 513b which is slidably engaged with a guide rail 515 together with a skate guide 513a.

The operation of the above-described arrangement will be described below. First, the cam gear 506 is rotated from the state shown in each of FIGS. 15 and 19 in a direction A as viewed in each of FIGS. 15 and 19, by a motor (not shown). The cam portion 506a is rotated by the rotation of the cam gear 506, and when the portion of the cam portion 506a which is engaged with the slide driving shaft 505b moves from a concentric portion 506a3 to a portion 506a2 of the cam portion 506a, the slide lever 505 starts to rotate in a direction B. With the rotation of the slide lever 505, the slide pin 505a presses the slot 503e of the slidable chassis 503 so that the slidable chassis 503 starts to travel toward the rotary cylinder 101 and, at the same time, the loading gear 507 which meshes with the gear portion 505c of the slide lever 505 starts to rotate in a direction C, the TR arm 508 starts to rotate in a direction D, and the SR arm 509 starts to rotate in a direction E.

Since the TR arm 508 is slidably engaged with the TR skate 511 via the TR link 510, the TR skate 511 starts to travel along the guide rail 514. Similarly, since the SR arm 509 is slidably engaged with the SR skate 513 via the SR link 512, the SR skate 513 starts to travel along the guide rail 515. Since power is transmitted from the slide lever 505 to the SR arm 509 through the meshed gears during this time, letting Zs be the number of teeth of the slide lever 505, letting Zt1 be the number of teeth of the gear portion 508a of the TR arm 508 and letting Zs1 be the number of teeth of the gear portion 509a of the SR arm 509, the angle of rotation of the SR arm 509 and the angle of rotation of the TR arm 508 with respect to a variation θs in the angle of rotation of the slide lever 505 are expressed as follows:

angle of rotation of TR arm
$\theta t = \theta s \times Zs/Zt1$
angle of rotation of SR arm
$\theta s1 = \theta s \times Zs/Zs1$
condition of number of teeth of gears
$Zt1 > Zs1$
$\theta t < \theta s1$ Since the SR arm 509 rotates faster than the TR arm 508, the SR skate 513 performs a tape loading operation while traveling faster than the TR skate 511.

Figure 20:
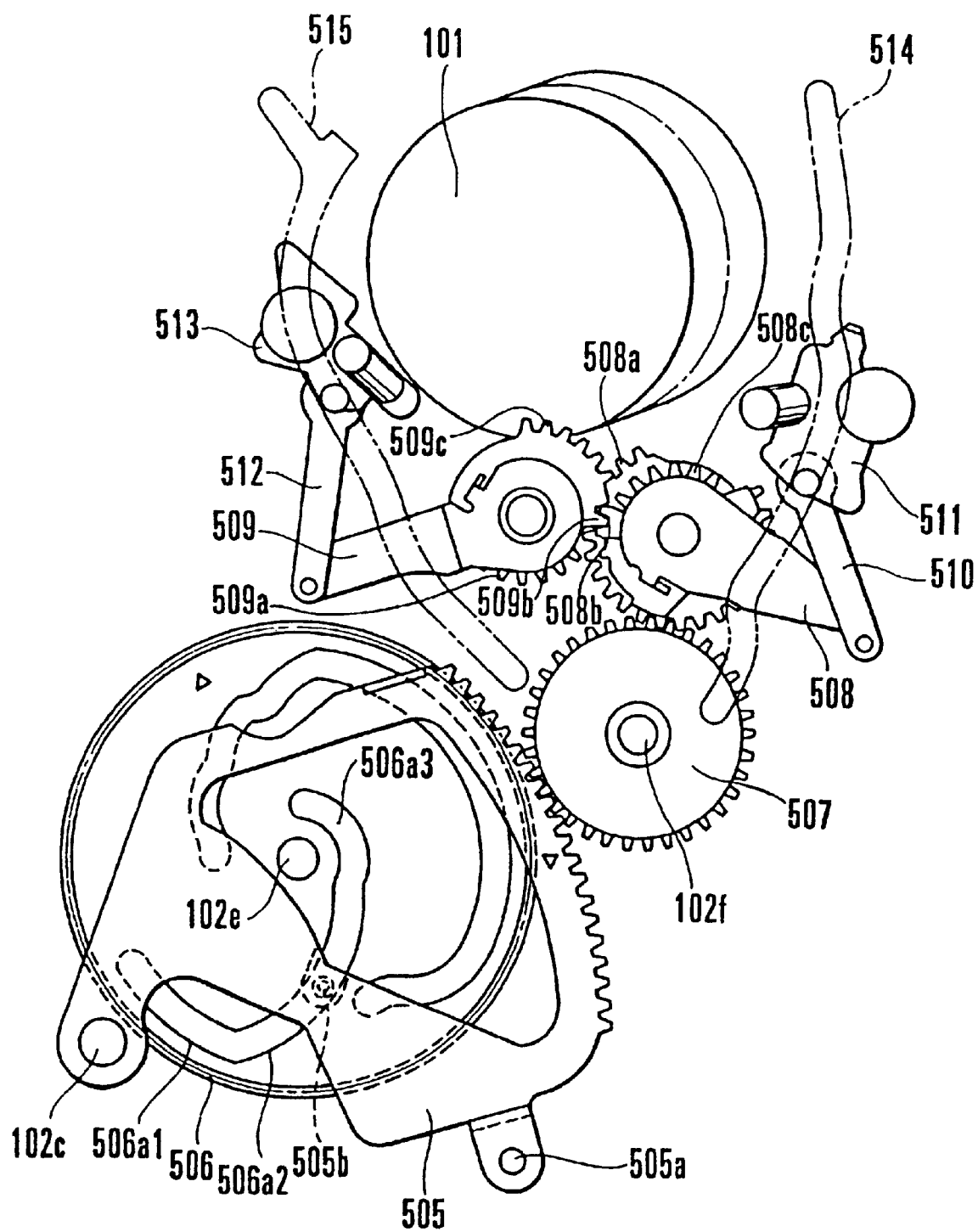
FIG. 20 is a plan view showing a state of mesh between gears during loading which differs from the state shown in FIG. 19.

When the tape loading operation proceeds to the state shown in FIG. 20 after it has been started, the mesh between the TR arm 508 and the SR arm 509 transfers from the mesh between the gear portion 508a of the TR arm 508 and the gear portion 509a of the SR arm 509 to the mesh between the gear portion 508b and the gear portion 509b. At this time, the relation between the number of teeth Zt2 of the gear portion 508b and the number of teeth Zs2 of the gear portion 509b becomes:

Zt2=Zs2

Therefore, the angle of rotation of the SR arm 509 and the angle of rotation of the TR arm 508 with respect to the variation θs in the angle of rotation of the slide lever 505 become:

angle of rotation of TR arm
θt=θs×Zs/Zt1
angle of rotation of SR arm
θs2=θt

Thus, the rotation of the SR arm 509 whose angle of rotation varies faster than the angle of rotation of the TR arm 508 is reduced in speed so that the variation in the angle of rotation of the SR arm 509 and the variation in the angle of rotation of the TR arm 508 become equal to each other and the traveling speeds of the SR skate 513 and the TR skate 511 become equal to each other.

Figure 21:
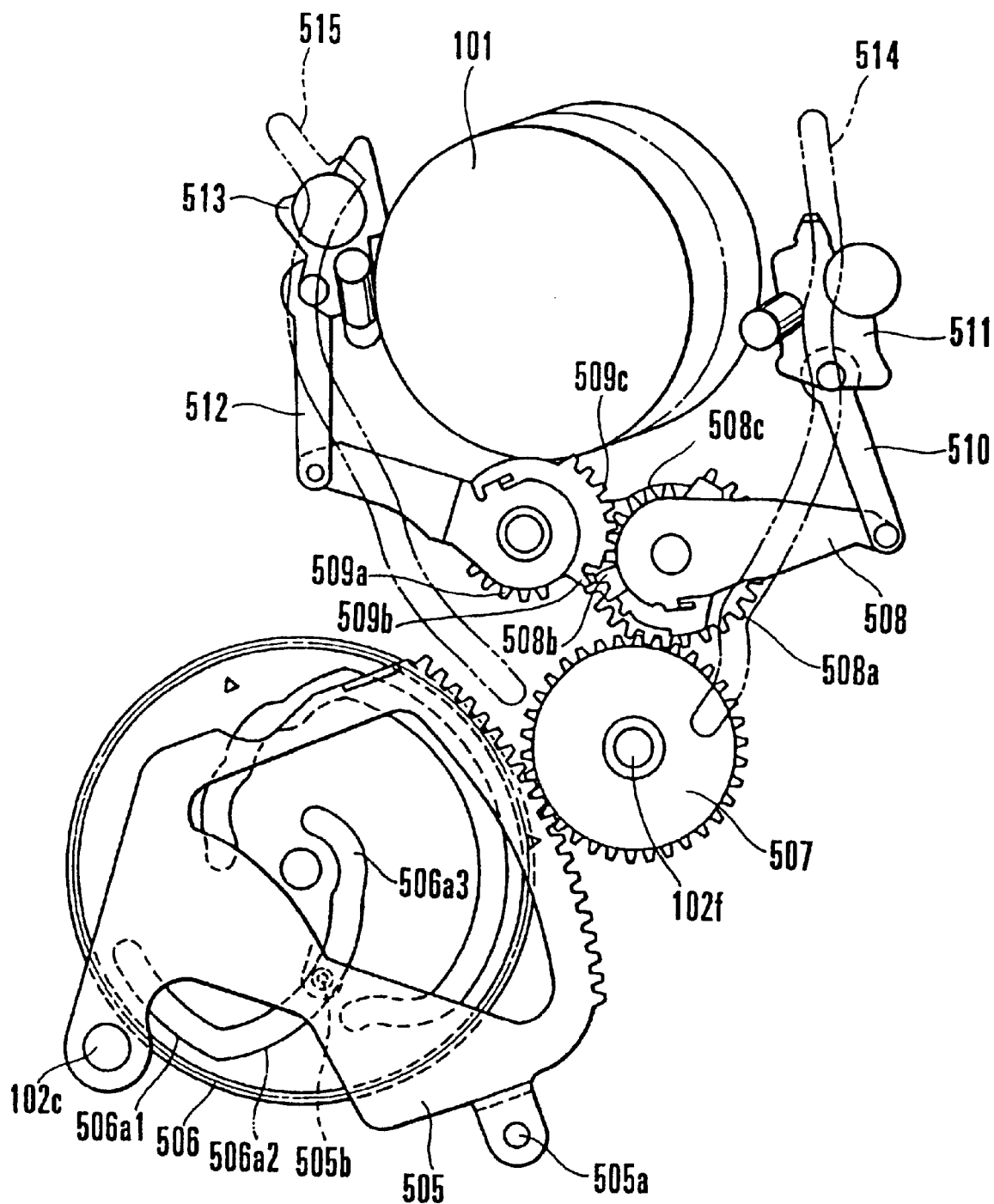
FIG. 21 is a plan view showing another state of mesh between gears during loading which differs from the state shown in FIG. 20.
Figure 22:
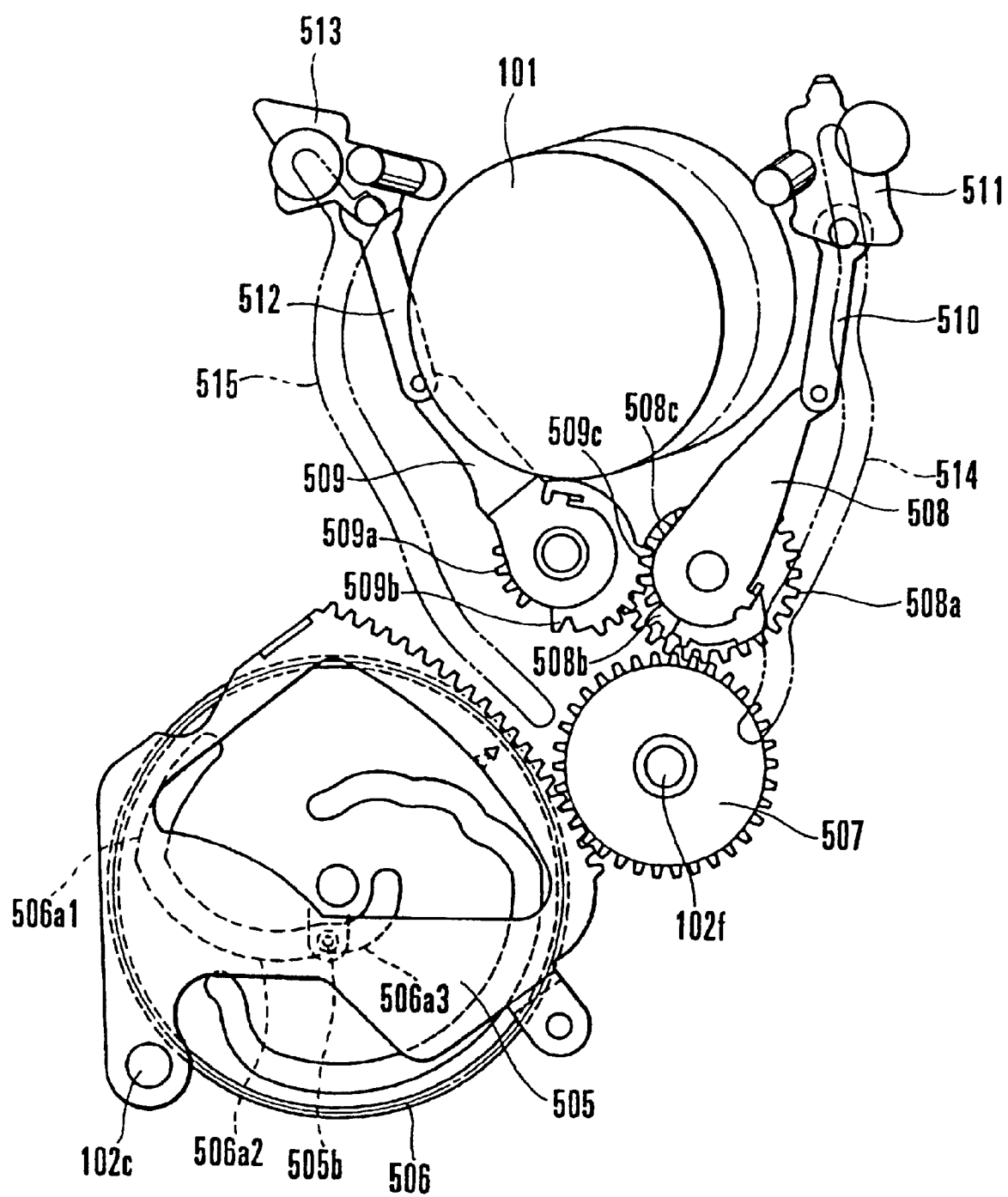
FIG. 22 is a plan view showing in detail the loading state of the tape loading device.

Then, when the tape loading operation proceeds from the state shown in FIG. 20 to the state shown in FIG. 21, the mesh between the TR arm 508 and the SR arm 509 transfers from the mesh between the gear portion 508b and the gear portion 509b to the mesh between the gear portion 508c and the gear portion 509c. At this time, the relation between the number of teeth zt3 of the gear portion 508c and the number of teeth Zs3 of the gear portion 509c becomes:

Zt3=Zs3

Therefore, the angle of rotation of the SR arm 509 and the angle of rotation of the TR arm 508 with respect to the variation θs in the angle of rotation of the slide lever 505 become:

angle of rotation of TR arm
θt=θs×Zs/Zt1
angle of rotation of SR arm
θs3=θs×Zs×Zt3/(Zt1×Zs3)

Thus, the relation in angle of rotation between the SR arm 509 and the TR arm 508 becomes:

θs3<θt so that the speed of rotation is reduced between the TR arm 508 and the SR arm 509 and the traveling speed of the SR skate 513 becomes smaller.

The TR arm 508 and the SR arm 509 travel while holding this variation in the angle of rotation, and the cam portion 506a of the cam gear 506 which is in sliding contact with the slide driving shaft 505b of the slide lever 505 travels from the portion 506a2 to the concentric portion 506a3. Accordingly, since the rotation of the slide lever 505 is stopped, the travel of the slidable chassis 503 and the rotations of the SR arm 509 and the TR arm 508 are stopped so that the tape loading operation is completed in the state shown in each of FIGS. 16 and 22.

Figure 23:
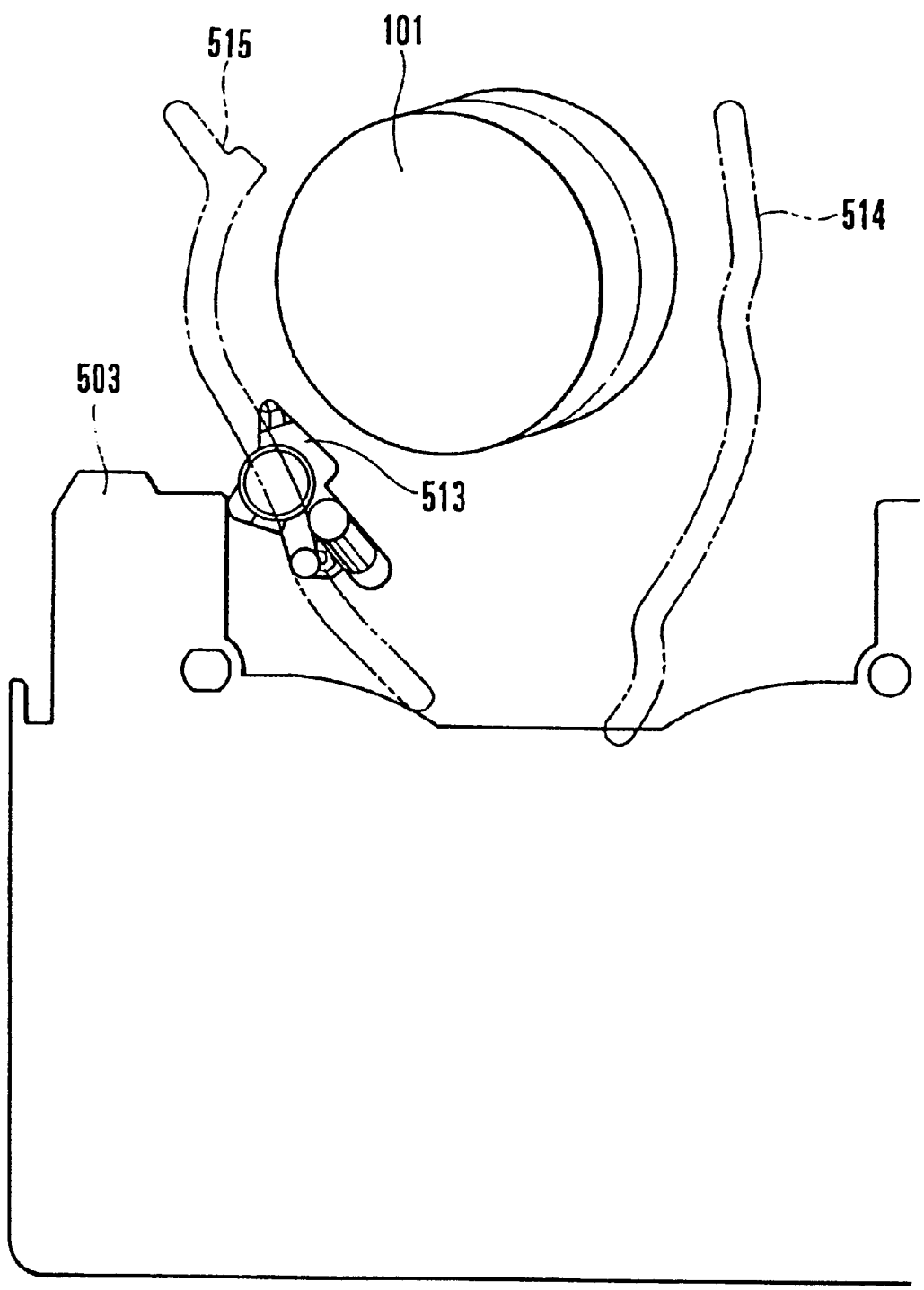
FIG. 23 is a schematic plan view showing a positional relation between a tape cassette and a skate during loading.
Figure 24:
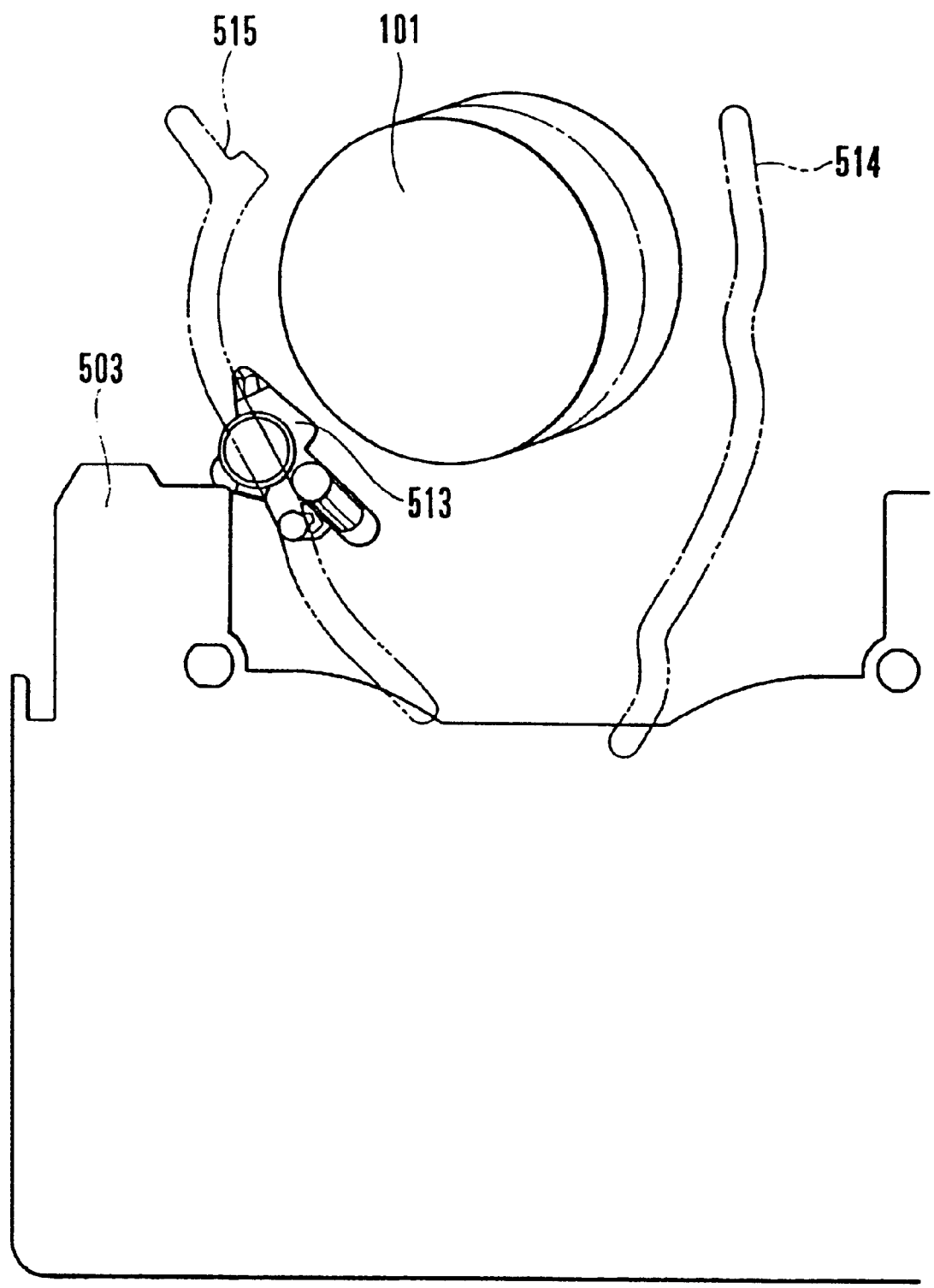
FIG. 24 is a schematic plan view showing another positional relation between the tape cassette and the skate during loading.

In the above-described manner, during the tape loading operation, the mesh between the three kinds of gear portions of the SR arm 509 and the three kinds of gear portions of the TR arm 508 is sequentially switched over. Accordingly, as shown in FIGS. 23 and 24, during the travel of the slidable chassis 503, the TR arm 508 makes a rotation in proportion to the travel of the slidable chassis 503, whereas the SR arm 509 rotates at a higher speed while the slidable chassis 503 is traveling from its unloading position to its middle position, and can be slowed down in the area from the middle position to its catching position.

Figure 25:
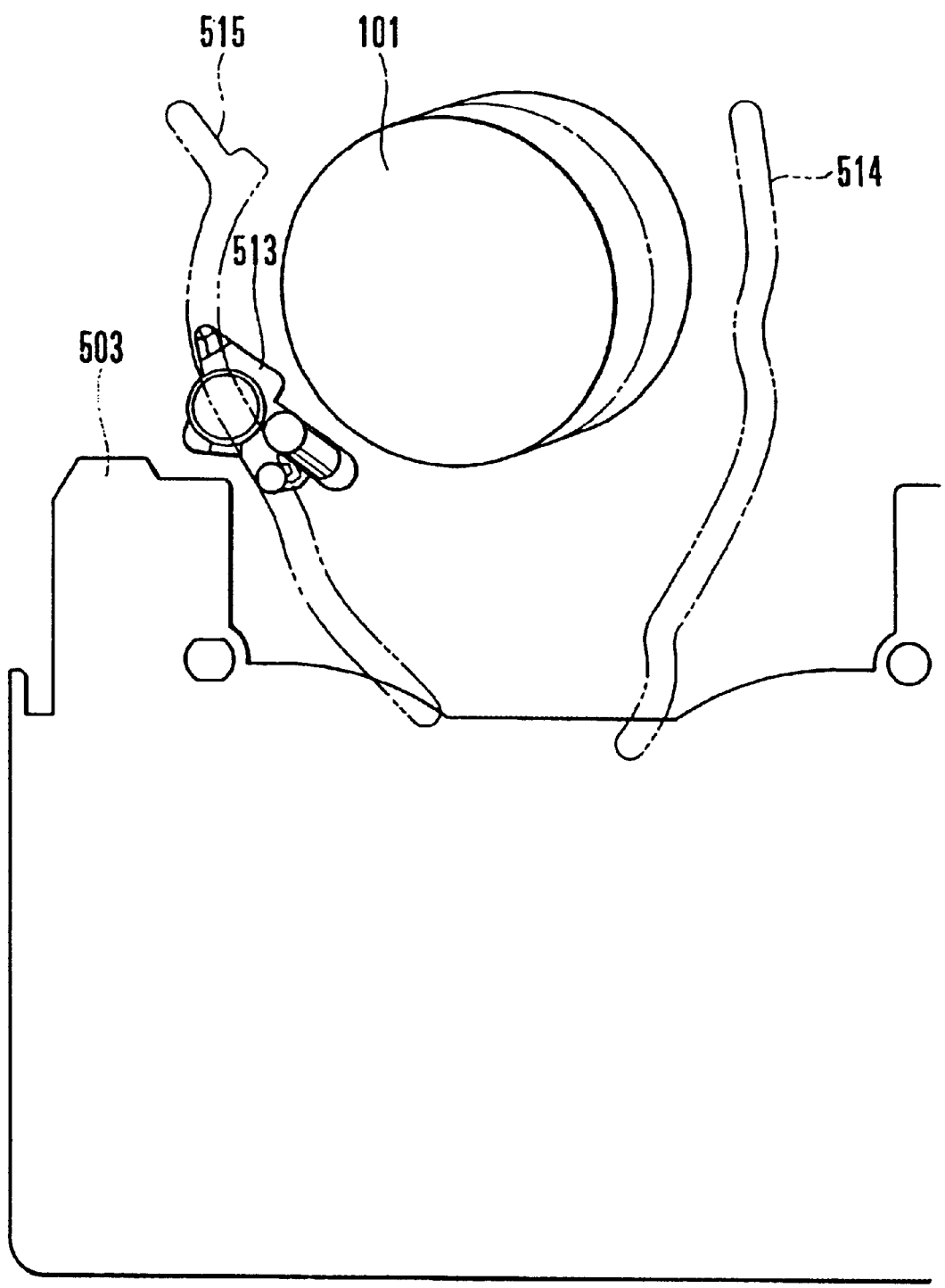
FIG. 25 is a schematic plan view showing another positional relation between the tape cassette and the skate during loading.
Figure 26:
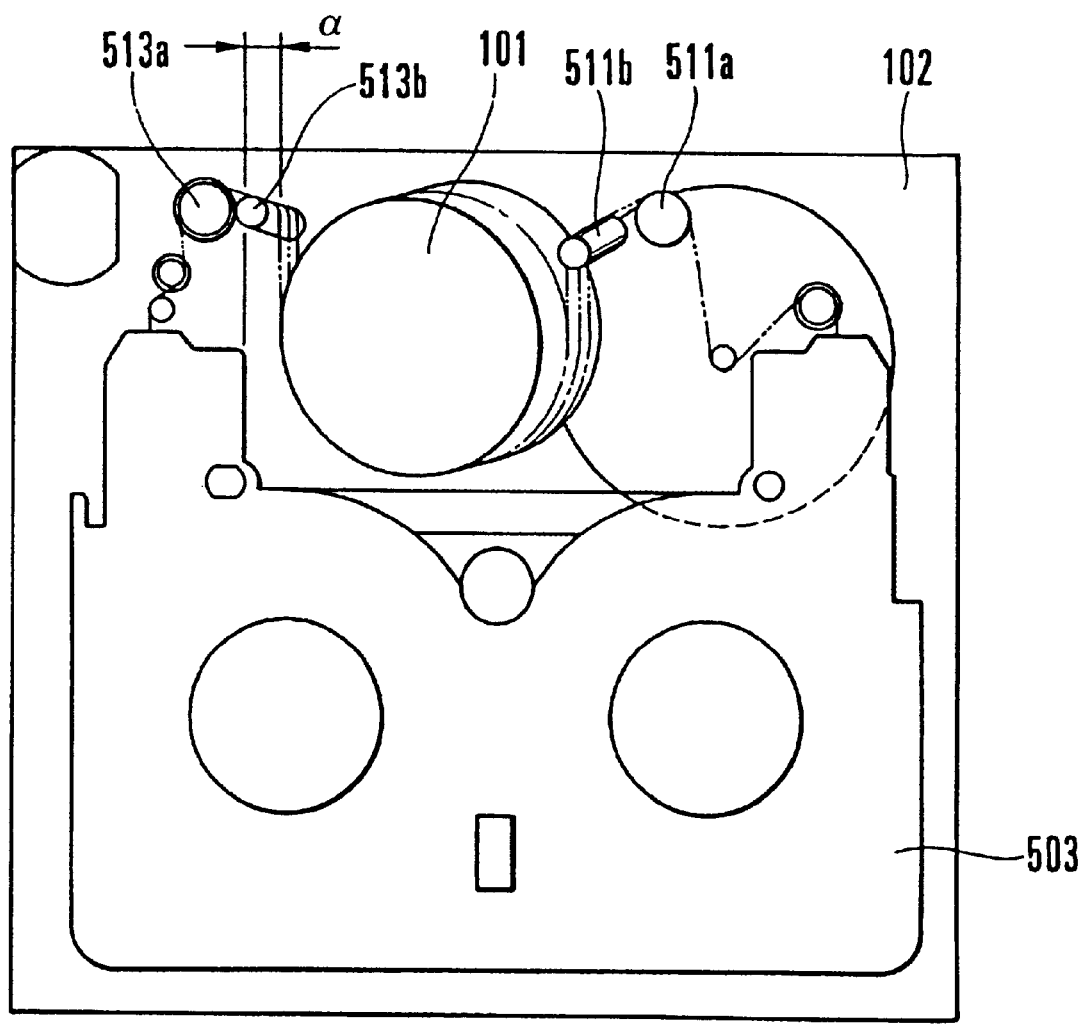
FIG. 26 is a schematic plan view showing a tape path.
Figure 27:
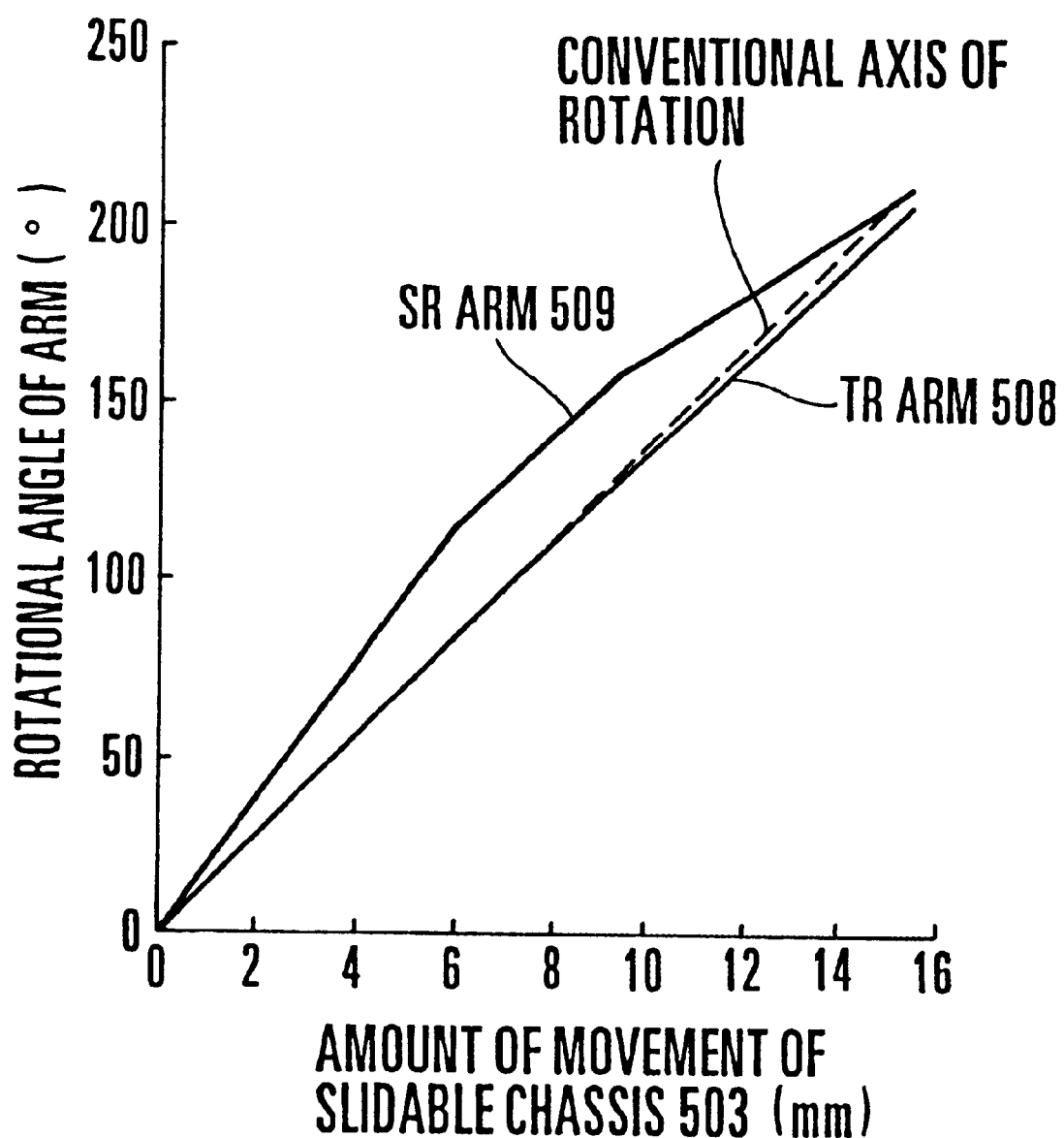
FIG. 27 is a characteristic chart showing the relation between the amount of travel of a slidable chassis and variations in the angles of rotation of arms which drive individual skates.

In addition, during the tape loading operation shown in FIGS. 25, 26 and 27, the SR arm 509 travels as follows in accordance with the timing of operation of the SR arm 509 and the tape cassette 200. First, the SR arm 509 passes through its faster-rotation area (refer to FIG. 27) while passing through the space between the rotary cylinder 101 and the tape cassette 200 which becomes smaller with the travel of the slidable chassis 503 toward the rotary cylinder 101. Then, after the SR arm 509 has moved out of the cassette mouth 200a, the SR arm 509 passes through its slower-rotation area (refer to FIG. 27) while the variation in the angle of rotation of the SR arm 509 is approaching the variation in the angle of rotation of the TR arm 508, so that the SR arm 509 and the TR arm 508 can complete catching finally at the same time.

In the present embodiment, in the tape loading and unloading operation, magnetic tape (not shown) is drawn from the supply reel of the tape cassette 200 by the guide posts 511c and 511d; 513c and 513d, and is then taken up. Accordingly, during the tape loading operation, as the SR skate 513 approaches its loading completion position toward which the load on the magnetic tape increases, the traveling speed of the SR skate 513 is made slower on a supply-reel side which is distant from a take-up reel, whereby the amount of variation in the load on the magnetic tape can be reduced and damage to the magnetic tape during loading can also be effectively reduced.

Incidentally, the unloading operation is performed in a sequence opposite to the above-described one.

As is apparent from the foregoing description, in accordance with the present embodiment, during loading, by varying the traveling speed of either one of guide means, it is possible to pass guide posts through a passage space when the passage space is as large as possible, the passage space becoming smaller as a tape cassette approaches a rotary cylinder from a position distant therefrom. Accordingly, all the guide posts can be driven by a single driving means without the need to incorporate a plurality of members for separately driving a plurality of driving means, whereby it is possible to realize simplification of the entire mechanism and a reduction in the total number of components parts used. In particular, the present embodiment can be effectively used in digital VCRs or the like which use tape cassettes having small cassette mouths.

What is claimed is:

1. A tape guiding device comprising:
   (a) a guide member having a guide slot having opposing sides along the length thereof,
   (b) a guide post for drawing tape from a cassette; and
   (c) a slider which supports said guide post and has a shaft guided along said opposing sides of said guide slot, said shaft having a stopper for preventing said shaft from coming off said guide slot,
   wherein a clearance between said stopper and said guide member adjacent one of said opposing sides of a portion of said guide slot is larger than a clearance between said stopper and guide member adjacent the other of said opposing sides of the portion of said guide slot.

2. A device according to claim 1, wherein said stopper has a step for defining a difference between the clearances.

3. A device according to claim 1, further comprising a member for controlling the clearances such that the clearances are approximately equal to each other over a further portion of the guide slot.

4. A device according to claim 3, wherein said member is provided at an end of said guide slot.

5. A device according to claim 3, wherein the member is formed on said guide member.

6. A device according to claim 1, wherein said guide member has an area bent toward said stopper.

7. A recording and/or reproducing apparatus comprising:

a tape loading device having tape guide means; wherein said tape guide means comprising a guide member having a guide slot having opposing sides along the length thereof, a guide post for drawing tape from a cassette, and a slider which supports said guide post and has a shaft guided along said opposing sides of said guide slot, said shaft having a stopper for preventing said shaft from coming off said guide slot, wherein a clearance between said stopper and said guide member adjacent one of said opposing sides of a portion of said guide slot is larger than a clearance between said stopper and said guide member adjacent the other of said opposing sides of the portion of said guide slot;

a rotary cylinder for recording and/or reproducing information on and/or from the tape; and a cassette mount for supporting the cassette.

8. A recording and/or reproducing apparatus according to claim 7, wherein said one side of said guide slot is closer to said rotary cylinder than said other side of said guide slot.

9. A tape guiding device comprising:

(a) a tape guide disposed for the movement over a chassis surface and having a tape drawing portion for drawing tape from a cassette and a positioning pin; and (b) a positioning member inclined with respect to the chassis surface and formed from a first engaging portion and a second engaging portion opposite to each other for positioning said positioning pin, said second engaging portion formed at a higher position than said first engaging portion with respect to the chassis surface, wherein said second engaging portion comprising a first inclined face and a second inclined face adjoined to said first inclined face, said second inclined face is inclined with respect to a plane approximately perpendicular to the chassis surface and inclined in a direction away from said first engaging portion.

10. A device according to claim 9, wherein said first engaging portion is on a plane approximately perpendicular to the chassis surface.

11. A device according to claim 9, wherein said second inclined face is formed over not less than half the thickness of said positioning member.

12. A device according to claim 9, wherein an angle of said second inclined face relative to the face approximately perpendicular to the chassis surface is larger than an angle of inclination of said positioning member relative to the chassis surface.

13. A device according to claim 9, wherein said first engaging portion and said second engaging portion are formed in an approximately V-like shape.

14. A recording and/or reproducing apparatus comprising:

a rotary cylinder for recording and/or reproducing information on and/or from the tape; and a tape loading mechanism drawing the tape from the cassette and loading the tape around the rotary cylinder, the tape loading mechanism including a tape guiding device having (a) a tape guide disposed for the movement over a chassis surface and having a tape drawing portion for drawing tape from a cassette and a positioning pin, and (b) a positioning member inclined with respect to the chassis surface and formed from a first engaging portion and a second engaging portion opposite to each other for positioning said positioning pin, said second engaging portion formed at a higher position than said first engaging portion with respect to the chassis surface, wherein said second engaging portion comprising a first inclined face and a second inclined face adjoined to said first inclined face, said second inclined face is inclined with respect to a plane approximately perpendicular to the chassis surface and inclined in a direction away from said first engaging portion.

15. A recording and/or reproducing apparatus according to claim 14, wherein said positioning member is formed integrally with a mounting base of said rotary cylinder.

16. A tape guiding device, comprising:

(a) a tape guide member disposed to move on a chassis surface and having a tape drawing portion and a positioning pin, (b) a positioning member having a recess portion formed thereon for positioning the positioning pin in the state that a tape loading operation is completed, wherein the recess portion has a first face which is inclined at a predetermined angle with respect to the positioning pin, a second face opposing to the first face and, a third face continuously formed from the second face and inclined at a predetermined angle relative to the second face.

17. A device according to claim 16, wherein the positioning member positions the positioning pin by an upper edge of the first face and an edge formed by the second face and the third face.

18. A device according to claim 16, wherein the edge formed by the second face and the third face is closer to the upper edge of the first face than a half position of the thickness of the positioning member.

19. A device according to claim 16, wherein an angle between a plane perpendicular to the chassis surface and the second or third face which is closer to the chassis surface is larger than an angle between the positioning member and the chassis surface.

20. A device according to claim 16, wherein the recess portion is of a V-like shape.

21. A recording and/or reproducing apparatus including a tape loading device having the tape guiding device according to claim 16, comprising:

a rotary cylinder for recording and/or reproducing information on and/or from the tape; and a tape loading mechanism drawing the tape from the cassette and loading the tape around the rotary cylinder.

22. A recording and/or reproducing apparatus according to claim 21, wherein the positioning member is formed integrally with a mounting base of said rotary cylinder.

* * * * *

UNITED STATES PATENT AND TRADEMARK OFFICE
CERTIFICATE OF CORRECTION

PATENT NO.    : 6,342,988 B1
DATED         : January 29, 2002
INVENTOR(S)   : Hidetoshi Matsuoka It is certified that error appears in the above-identified patent and that said Letters Patent is hereby corrected as shown below:

<u>Column 13,</u>
Line 26, delete "teeth zt3" and insert -- teeth Z+3 --.

Signed and Sealed this

Third Day of December, 2002

JAMES E. ROGAN
*Director of the United States Patent and Trademark Office*